US011395202B2

(12) United States Patent
Tsuboi et al.

(10) Patent No.: US 11,395,202 B2
(45) Date of Patent: Jul. 19, 2022

(54) TERMINAL APPARATUS, BASE STATION APPARATUS, COMMUNICATION METHOD, AND INTEGRATED CIRCUIT

(71) Applicants: Sharp Kabushiki Kaisha, Sakai (JP); FG Innovation Company Limited, Tuen Mun (HK)

(72) Inventors: Hidekazu Tsuboi, Sakai (JP); Shohei Yamada, Sakai (JP); Kazunari Yokomakura, Sakai (JP); Hiroki Takahashi, Sakai (JP)

(73) Assignees: SHARP KABUSHIKI KAISHA, Sakai (JP); FG INNOVATION COMPANY LIMITED, New Territories (HK)

( * ) Notice: Subject to any disclaimer, the term of this patent is extended or adjusted under 35 U.S.C. 154(b) by 0 days.

(21) Appl. No.: 16/469,672

(22) PCT Filed: Dec. 12, 2017

(86) PCT No.: PCT/JP2017/044546
§ 371 (c)(1),
(2) Date: Jun. 14, 2019

(87) PCT Pub. No.: WO2018/116910
PCT Pub. Date: Jun. 28, 2018

(65) Prior Publication Data
US 2019/0313309 A1    Oct. 10, 2019

(30) Foreign Application Priority Data

Dec. 20, 2016   (JP) .............................. JP2016-246465

(51) Int. Cl.
*H04W 36/08* (2009.01)
*H04W 76/11* (2018.01)
(Continued)

(52) U.S. Cl.
CPC ........... *H04W 36/08* (2013.01); *H04L 5/0094* (2013.01); *H04W 36/16* (2013.01);
(Continued)

(58) Field of Classification Search
CPC .. H04W 36/08; H04W 76/11; H04W 74/0833
See application file for complete search history.

(56) References Cited

U.S. PATENT DOCUMENTS

| 10,117,199 B2 * | 10/2018 | Yum ................... H04L 27/0008 |
| 2014/0211756 A1 * | 7/2014 | Bontu ................. H04W 36/026 370/331 |

(Continued)

FOREIGN PATENT DOCUMENTS

| EP | 3 087 692 A1 | 11/2016 |
| EP | 3 346 774 A1 | 7/2018 |

(Continued)

OTHER PUBLICATIONS

Abedini et al., "Directional Synchronization in Assisted Millimeter Wave Systems", U.S. Appl. No. 62/411,416, filed Oct. 21, 2016, 61 pages.

(Continued)

*Primary Examiner* — James P Duffy
(74) *Attorney, Agent, or Firm* — Keating & Bennett, LLP

(57) ABSTRACT

A terminal apparatus includes a receiver configured to receive a radio resource control (RRC) reconfiguration message from a base station apparatus, and a controller configured to configure a parameter based on the parameter included in the RRC reconfiguration message. The parameter includes at least identity information of a target cell and a configuration of a subcarrier spacing, and the configuration of the subcarrier spacing is configured for each of the target cells.

8 Claims, 13 Drawing Sheets

(51) Int. Cl.
  *H04W 74/08* (2009.01)
  *H04W 76/27* (2018.01)
  *H04L 5/00* (2006.01)
  *H04W 36/16* (2009.01)
  *H04W 80/02* (2009.01)
  *H04W 88/02* (2009.01)
  *H04W 88/08* (2009.01)
  *H04W 76/10* (2018.01)

(52) U.S. Cl.
  CPC ....... *H04W 74/0833* (2013.01); *H04W 76/10* (2018.02); *H04W 76/11* (2018.02); *H04W 76/27* (2018.02); *H04W 80/02* (2013.01); *H04W 88/023* (2013.01); *H04W 88/08* (2013.01)

(56) References Cited

U.S. PATENT DOCUMENTS

2017/0311315 A1* 10/2017 Islam ................ H04W 72/0446
2018/0152907 A1* 5/2018 Zhang ................ H04W 74/006
2018/0249400 A1 8/2018 Harada et al.

FOREIGN PATENT DOCUMENTS

| WO | 2015/099889 A1 | 7/2015 |
| WO | 2016/137532 A1 | 9/2016 |
| WO | 2017/038741 A1 | 3/2017 |
| WO | 2018/038514 A1 | 3/2018 |
| WO | 2018/064084 A1 | 4/2018 |

OTHER PUBLICATIONS

Official Communication issued in International Patent Application No. PCT/JP2017/044546, dated Jan. 16, 2018.

NTT DOCOMO, "Revision on SI: Study on New Radio Access Technology", 3GPP TSG RAN Meeting #72, RP-161214, Jun. 13-16, 2016, 8 pages.

LG Electronics, "Discussion on alignment for different numerology multiplexing", 3GPP TSG RAN WG1 Meeting #86, R1-166878, Aug. 22-26, 2016, 5 pages.

Huawei et al., "RRC Support of Multiple Numerologies", 3GPP TSG-RAN WG2 Meeting #96, R2-167582, Nov. 14-18, 2016, 3 pages.

Huawei et al., "Discussion on UE behavior on mixed numerology carrier", 3GPP TSG RAN WG1 Meeting #86bis, R1-1609425, Oct. 10-14, 2016, 6 pages.

"3rd Generation Partnership Project; Technical Specification Group Radio Access Network; Evolved Universal Terrestrial Radio Access (E-UTRA); Radio Resource Control (RRC); Protocol specification (Release 14)", 3GPP TS 36.331 V14.0.0, Sep. 2016, pp. 1-42.

"3rd Generation Partnership Project; Technical Specification Group Radio Access Network; Study on New Radio (NR) Access Technology Physical Layer Aspects (Release 14)", 3GPP TR 38.802 V1.0.0, Nov. 2016, 9 pages.

Ericsson, "Aggregation of carriers in NR", 3GPP TSG-RAN WG2 #95, R2-165328, Aug. 22-26, 2016, 4 pages.

Samsung, "Discussion on numerology aspects of NR synchronization signal", 3GPP TSG RAN WG1 Meeting #86, R1-166795, Aug. 22-26, 2016, pp. 1-5.

InterDigital Communications, "MAC Layer Impact of Supporting Different Services", 3GPP TSG-RAN WG2 #96, R2-168468, Nov. 14-18, 2016, pp. 1-4.

Huawei et al., "On numerology determination for data channel", 3GPP TSG RAN WG1 Meeting #87, R1-1611652, Nov. 14-18, 2016, 3 pages.

InterDigital Communications, "Random Access and Support for Multiple Numerologies for NR", 3GPP TSG-RAN WG1 #87, R1-1612310, Nov. 14-18, 2016, pp. 1-4.

Motorola Mobility, "Discussion on RACH numerology and procedure", 3GPP TSG RAN WG1 Meeting #87, R1-1612746, Nov. 14-18, 2016, pp. 1-5.

* cited by examiner

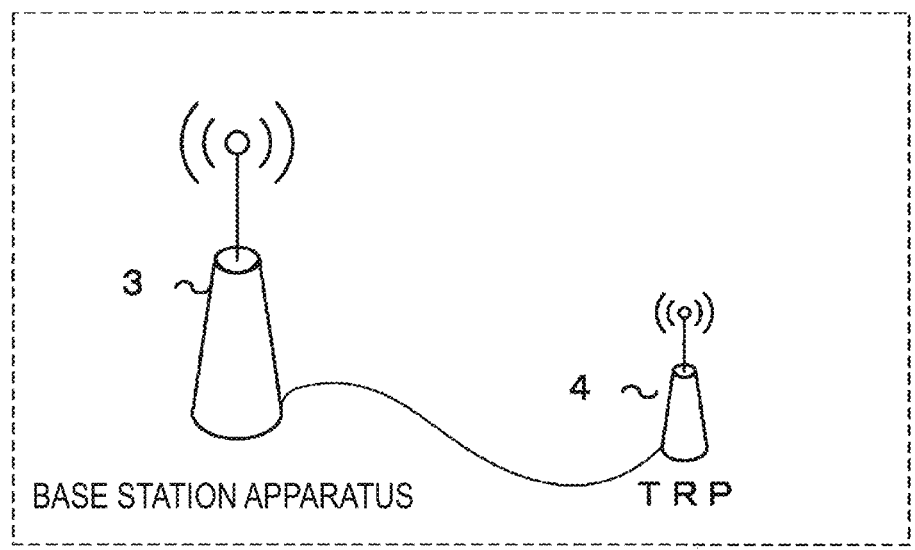
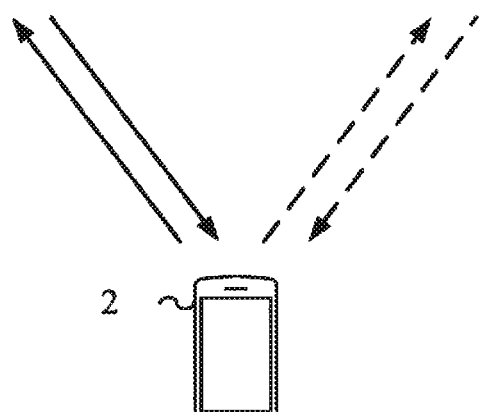
FIG. 1

```
RRCConnectionReconfiguration ::=          SEQUENCE {
    rrc-TransactionIdentifier             RRC-TransactionIdentifier,
    measConfig                            MeasConfig,
    mobilityControlInfo                   MobilityControlInfo,
    dedicatedInfoNASList                  SEQUENCE (SIZE(1..maxDRB)) OF DedicatedInfoNAS,
    radioResourceConfigDedicated          RadioResourceConfigDedicated,
    securityConfigHO                      SecurityConfigHO,
    otherConfig                           OtherConfig,
    fullConfig                            ENUMERATED {true},
    sCellToReleaseList                    SCellToReleaseList,
    sCellToAddModList                     SCellToAddModList,
    scg-Configuration                     SCG-Configuration,
    systemInfomationBlockDedicated        OCTET STRING (CONTAINING SIBx)
}
```

FIG. 8

```
MobilityControlInfo ::=    SEQUENCE {
    targetPhysCellId          PhysCellId,
    carrierFreq               CarrierFreqEUTRA,
    carrierBandwidth          CarrierBandwidthEUTRA,
    additionalSpectrumEmission  AdditionalSpectrumEmission,
    t304                      ENUMERATED {
                                  ms50, ms100, ms150, ms200, ms500, ms1000,
                                  ms2000, spare1},
    newUE-Identity            C-RNTI,
    radioResourceConfigCommon RadioResourceConfigCommon,
    rach-ConfigDedicated      RACH-ConfigDedicated
}
```

FIG. 9

```
RadioResourceConfigCommon ::=   SEQUENCE {
    rach-ConfigCommon           RACH-ConfigCommon,
    prach-Config                PRACH-Config,
    pdsch-ConfigCommon          PDSCH-ConfigCommon,
    pusch-ConfigCommon          PUSCH-ConfigCommon,
    pucch-ConfigCommon          PUCCH-ConfigCommon,
    soundingRS-UL-ConfigCommon  SoundingRS-UL-ConfigCommon,
    uplinkPowerControlCommon    UplinkPowerControlCommon,
    antennaInfoCommon           AntennaInfoCommon,
    p-Max                       P-Max,
    tdd-Config                  TDD-Config,
}
```

FIG. 10

```
SCG-Configuration ::= CHOICE {
    release     NULL,
    setup       SEQUENCE {
        scg-ConfigPartMCG    SCG-ConfigPartMCG,
        scg-ConfigPartSCG    SCG-ConfigPartSCG
    }
}
```

FIG. 12

```
SCG-ConfigPartSCG ::=    SEQUENCE {
    radioResourceConfigDedicatedSCG    RadioResourceConfigDedicatedSCG,
    pSCellToAddMod                     PSCellToAddMod,
    sCellToAddModListSCG               SCellToAddModList,
    sCellToReleaseListSCG              SCellToReleaseList,
    mobilityControlInfoSCG             MobilityControlInfoSCG
}
```

FIG. 13

TERMINAL APPARATUS, BASE STATION APPARATUS, COMMUNICATION METHOD, AND INTEGRATED CIRCUIT

TECHNICAL FIELD

The present invention relates to a terminal apparatus, a base station apparatus, a communication method, and an integrated circuit.

This application claims priority based on JP 2016-246465 filed on Dec. 20, 2016, the contents of which are incorporated herein by reference.

BACKGROUND ART

A radio access method and a radio network for cellular mobile communications (hereinafter, referred to as "Long Term Evolution (LTE: Trade Name)", or "Evolved Universal Terrestrial Radio Access (EUTRA)") have been studied in the 3rd Generation Partnership Project (3GPP). Furthermore, as a radio access method and a radio access network technology for a fifth-generation cellular system, technical studies and standardization of LTE-Advanced Pro which is an enhanced technology of LTE, and New Radio Technology (NR) which is a new radio access technology, are conducted by the 3GPP (NPL 1).

The fifth-generation cellular system requires three anticipated scenarios for services: enhanced Mobile BroadBand (eMBB) which realizes high-speed, high-capacity transmission, Ultra-Reliable and Low Latency Communication (URLLC) which realizes low-latency, high-reliability communication, and massive Machine Type Communication (mMTC) that allows a large number of machine type devices to be connected in a system such as Internet of Things (IoT).

Furthermore, for NR, a communication by using different physical parameters (e.g., subcarrier spacings) is being studied (NPL 2). Terminal apparatuses are required to specify which of the different physical parameters to be used to communicate with a base station apparatus.

CITATION LIST

Non Patent Literature

NPL 1: RP-161214, NTT DOCOMO, "Revision of SI: Study on New Radio Access Technology", June 2016
NPL 2: 3GPP R1-166878http://www.3gpp.org/ftp/ts-g_ran/WG1_RL1/TSGR1_86/Docs/R1-166878.zip
NPL 3: 3GPP R2-167582http://www.3gpp.org/ftp/ts-g_ran/WG2_RL2/TSGR2_96/Docs/R2-167582.Zip

SUMMARY OF INVENTION

Technical Problem

With regard to NR, for a situation in which a handover is performed with service continuity maintained based on the capability of the terminal and the physical parameter supported by the cell, a method for changing from one physical parameter (numerology) to another physical parameter (numerology) to continue communication has been considered (NPL 3). However, a method for notifying necessary parameters has not been studied, and there has been a problem in that the base station apparatus and the terminal apparatus cannot communicate efficiently.

In view of the circumstances described above, an object of an aspect of the present invention is to provide a terminal apparatus capable of efficiently communicating with a base station apparatus, a base station apparatus for communicating with the terminal apparatus, a communication method used for the terminal apparatus, a communication method used for the base station apparatus, an integrated circuit mounted on the terminal apparatus, and an integrated circuit mounted on the base station apparatus.

Solution to Problem (1) In order to accomplish the object described above, an aspect of the present invention is contrived to provide the following measures. That is, a first aspect of the present invention is a terminal apparatus for communicating with a base station apparatus via a cell, the terminal apparatus for communicating with a base station apparatus via a cell including: a receiver configured to receive a radio resource control (RRC) reconfiguration message from the base station apparatus; and a controller configured to configure a parameter based on the parameter included in the RRC reconfiguration message. The parameter includes at least identity information of a target cell and a configuration of a subcarrier spacing, and the configuration of the subcarrier spacing is configured for each of the target cells.

(2) A second aspect of the present invention is a base station apparatus for communicating with a terminal apparatus via a cell, the base station apparatus including: a transmitter configured to transmit a radio resource control (RRC) reconfiguration message to the terminal apparatus; and a controller configured to generate a parameter to be included in the RCC reconfiguration message. The parameter includes at least identity information of a target cell and a configuration of a subcarrier spacing, and the configuration of the subcarrier spacing is configured for each of the target cells.

(3) A third aspect of the present invention is a communication method applied to a terminal apparatus for communicating with a base station apparatus via a cell, the communication method including at least the steps of: receiving a radio resource control (RRC) reconfiguration message from the base station apparatus; and configuring a parameter based on the parameter included in the RRC reconfiguration message. The parameter includes at least identity information of a target cell and a configuration of a subcarrier spacing, and the configuration of the subcarrier spacing is configured for each of the target cells.

(4) A fourth aspect of the present invention is an integrated circuit implemented on a terminal apparatus for communicating with a base station apparatus via a cell, the integrated circuit causing the terminal to perform: receiving a radio resource control (RRC) reconfiguration message from the base station apparatus, and configuring a parameter based on the parameter included in the RRC reconfiguration message. The parameter includes at least identity information of a target cell and a configuration of a subcarrier spacing, and the configuration of the subcarrier spacing is configured for each of the target cells.

Advantageous Effects of Invention

According to an aspect of the present invention, the terminal apparatus and the base station apparatus can communicate efficiently.

BRIEF DESCRIPTION OF DRAWINGS

FIG. 1 is a conceptual diagram of a radio communication system according to the present embodiment.

FIG. 8 is a diagram illustrating an example of an RCC reconfiguration message according to an embodiment of the present invention.

FIG. 9 is a diagram illustrating an example of elements included in an RRC reconfiguration message according to an embodiment of the present invention.

FIG. 10 is a diagram illustrating an example of elements included in an RRC reconfiguration message according to an embodiment of the present invention.

FIG. 12 is a diagram illustrating an example of elements included in an RRC reconfiguration message according to an embodiment of the present invention.

FIG. 13 is a diagram illustrating an example of elements included in an RRC reconfiguration message according to an embodiment of the present invention.

DESCRIPTION OF EMBODIMENTS

Figure 2:
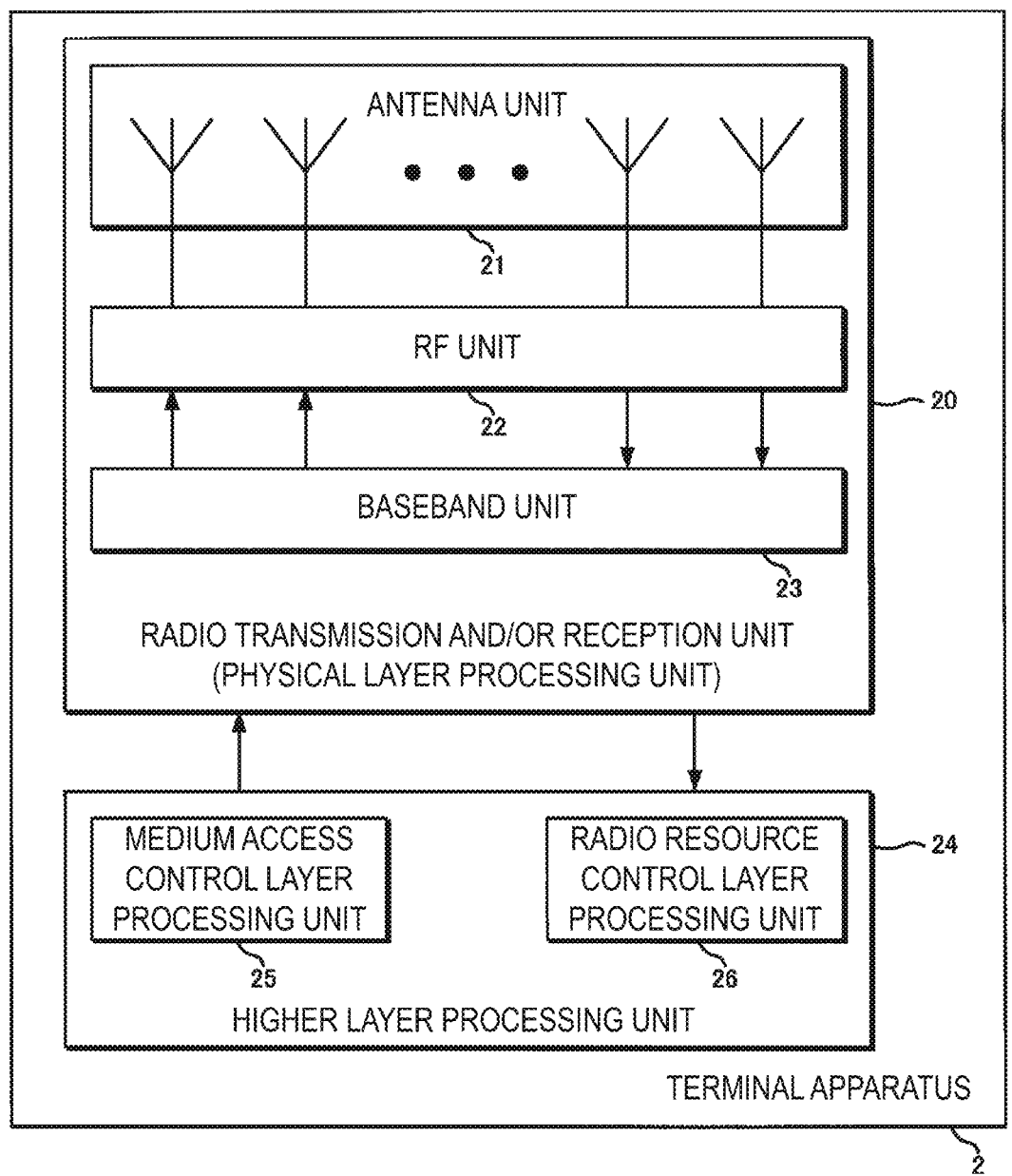
FIG. 2 is a block diagram illustrating an example of a schematic configuration of a terminal apparatus according to an embodiment of the present invention.

Embodiments of the present invention will be described below.

A radio communication system and a radio network according to the present embodiment will be described.

LTE (and LTE-A Pro) and NR may be defined as different Radio Access Technologies (RATs). NR may be defined as a technology included in LTE. LTE may be defined as a technology included in NR. The present embodiment may be applied to NR, LTE and other RATs. Terms associated with LTE are used in the following description. However, the present invention may be applied to other technologies using other terms.

FIG. 1 is a conceptual diagram of a radio communication system according to the present embodiment. In FIG. 1, the radio communication system includes a terminal apparatus 2 and a base station apparatus 3. Furthermore, the base station apparatus 3 may include one or more Transmission Reception Points 4 (TRPs). The base station apparatus 3 may configure a coverage (communicable area) controlled by the terminal apparatus 3 to have one or more cells to serve the terminal apparatus 2. The base station apparatus 3 may also configure a coverage (communicable area) controlled by one or more transmission reception points 4 to have one or more cells to serve the terminal apparatus 2. The base station apparatus 3 may also divide one cell into multiple subregions (which is also referred to as Beamed areas or Beamed cells) to serve the terminal apparatus 2 in each of the multiple subregions. Here, a subregion may be identified based on a beam index used for beamforming, a quasi co-location index, or a precoding index.

The communication area covered by the base station apparatus 3 may vary in size and shape for each frequency. Moreover, the covered area may vary for each frequency. A radio network, in which cells having different types of base station apparatuses 3 and different cell radii coexist at the same frequency or different frequencies to form a single communication system, is referred to as a heterogeneous network.

A radio communication link from the base station apparatus 3 to the terminal apparatus 2 is referred to as a downlink. A radio communication link from the terminal apparatus 2 to the base station apparatus 3 is referred to as an uplink. A direct radio communication link from the terminal apparatus 2 to another terminal apparatus 2 is referred to as a sidelink.

In FIG. 1, in a radio communication between the terminal apparatus 2 and the base station apparatus 3, and/or a radio communication between the terminal apparatus 2 and another terminal apparatus 2, Orthogonal Frequency Division Multiplexing (OFDM) including a Cyclic Prefix (CP), Single-Carrier Frequency Division Multiplexing (SC-FDM), Discrete Fourier Transform Spread OFDM (DFT-S-OFDM), or Multi-Carrier Code Division Multiplexing (MC-CDM) may be used.

Furthermore, in FIG. 1, in the radio communication between the terminal apparatus 2 and the base station apparatus 3, and/or the radio communication between the terminal apparatus 2 and another terminal apparatus 2, Universal-Filtered Multi-Carrier (UFMC), Filtered OFDM (F-OFDM), Windowed OFDM, or Filter-Bank Multi-Carrier (FBMC) may be used.

Note that the present embodiment will be described by using OFDM symbols with the assumption that a transmission scheme is OFDM, and use of any other transmission scheme is also included in an aspect of the present invention.

Furthermore, in FIG. 1, in the radio communication between the terminal apparatus 2 and the base station apparatus 3, and/or the radio communication between the terminal apparatus 2 and another terminal apparatus 2, the CP may not be used, or the above-described transmission scheme with zero padding may be used instead of the CP. Moreover, the CP or zero passing may be added both forward and backward.

The terminal apparatus 2 operates by regarding the inside of a cell as a communication area. The terminal apparatus 2 may move to another appropriate cell through a cell re-selection procedure in a case that the terminal apparatus 2 is not wirelessly connected (also referred to as an idle state or an RRC_IDLE state). In a case where the terminal apparatus 2 is wirelessly connected (also referred to as a connected state, or an RRC_CONNECTED state), the terminal apparatus 2 may move to another appropriate cell through a handover procedure. The appropriate cell generally refers to a cell that may be found not to prohibit access from the terminal apparatus 2 based on information indicated by the base station apparatus 3 and that has downlink reception quality satisfying a predefined condition. In a case where the terminal apparatus 2 is not wirelessly connected (also referred to as an idle state or an RRC_IDLE state), the terminal apparatus 2 may move to another appropriate cell through a cell re-selection procedure. The terminal apparatus 2 may move to another cell by a handover procedure in an inactive state.

In a case that a terminal apparatus 2 can communicate with a certain base station apparatus 3, one of the cells of the base station apparatus 3 configured to be used for the communication with the terminal apparatus is referred to as a Serving cell, and the other cells that are not used for the communication may be referred to as Neighboring cells. Further, some or all of the system information required in the serving cell may be broadcast or notified to the terminal apparatus 2 in another cell.

According to the present embodiment, one or more serving cells are configured for the terminal apparatus 2. Multiple serving cells to be configured for the terminal apparatus 2 may include one primary cell and one or more secondary cells. The primary cell is a serving cell in which an initial connection establishment procedure has been performed, a serving cell in which a connection re-establishment procedure has been initiated, or a cell which has been indicated as a primary cell during a handover procedure. One or more secondary cells may be configured at a point of time when or after a Radio Resource Control (RRC) connection is established. Also, a cell group (also referred to as a master cell group (MCG)) that includes one or more serving cells including a primary cell (PCell), and at least one cell group (also referred to as a secondary cell group (SCG)) that includes one or more serving cells not including a primary cell but including a primary secondary cell (PSCell) may be configured for the terminal apparatus 2, where the primary secondary cell allows at least a random access procedure to be performed, and does not become in a deactivated state.

Time Division Duplex (TDD) and/or Frequency Division Duplex (FDD) may be applied to the radio communication system according to the present embodiment. A time division duplex (TDD) scheme or a frequency division duplex (FDD) scheme may be applied to all the multiple cells. Cells to which the TDD scheme is applied and cells to which the FDD scheme is applied may be aggregated.

A carrier corresponding to a serving cell in the downlink is referred to as a downlink component carrier (or a downlink carrier). A carrier corresponding to a serving cell in the uplink is referred to as an uplink component carrier (or an uplink carrier). A carrier corresponding to a serving cell in the sidelink is referred to as a sidelink component carrier (or a sidelink carrier). The downlink component carrier, the uplink component carrier, and/or the sidelink component carrier are collectively referred to as a component carrier (or a carrier).

Physical channels and physical signals according to the present embodiment will be described.

In FIG. 1, the following physical channels are used for the radio communication between the terminal apparatus 2 and the base station apparatus 3. The physical channels are used for transmission of information output from a higher layer.

Physical Broadcast CHannel (PBCH)
Physical Control CHannel (PCCH)
Physical Shared CHannel (PSCH)
Physical Random Access CHannel (PRACH)

The PBCH is used by the base station apparatus 3 to broadcast essential information block, such as Master Information Block (MIB) and Essential Information Block (EIB), that includes essential information needed by the terminal apparatus 2. Here, one or more essential information blocks may be transmitted as an essential information message. For example, the essential information block may include information about a position within a superframe including multiple radio frames (for example, information for indicating some or all of frame numbers (System Frame Numbers (SFNs)) in the superframe). Furthermore, in a case that different essential information blocks are transmitted in the respective areas within the cell, each essential information block may include information for identifying the corresponding area (for example, identifier information about a transmission beam constituting the area). Moreover, the essential information may include some or all of the pieces of System Information (SI) needed for connection to the cell or for mobility. The system information may be divided into multiple blocks (system information blocks) depending on an intended use. The system information message may include one or more system information blocks. The essential information message may be a part of the system information message. Also, some or all of the important information messages may be referred to as minimum system information (Minimum SI). In a case that all of the valid minimum system information in a given cell cannot be acquired, the terminal apparatus 2 may consider the cell as a cell to which access is prohibited (i.e., a Barred Cell).

The PCCH is used to transmit Uplink Control Information (UCI) in a case of uplink radio communication (radio communication from the terminal apparatus 2 to the base station apparatus 3). Here, the uplink control information may include Channel State Information (CSI) used to indicate a downlink channel state. The uplink control information may include Scheduling Request (SR) used to request an UL-SCH resource. The uplink control information may include Hybrid Automatic Repeat reQuest ACKnowledgment (HARQ-ACK). The HARQ-ACK indicated may be a HARQ-ACK for downlink data (Transport block, Medium Access Control Protocol Data Unit (MAC PDU), or Downlink-Shared CHannel (DL-SCH)).

Further, the PCCH is used to transmit downlink control information (DCI) in a case of downlink radio communication (radio communication from the base station apparatus 3 to the terminal apparatus 2). Here, one or more pieces of DCI (which may be referred to as DCI formats) are defined for transmission of the downlink control information. In other words, a field for the downlink control information is defined as DCI and is mapped to information bits.

For example, the DCI may be defined to include information for indicating whether a signal included in a scheduled PSCH corresponds to downlink radio communication or uplink radio communication.

For example, the DCI may be defined to include information for indicating a downlink transmission period included in a scheduled PSCH.

For example, the DCI may be defined to include information for indicating an uplink transmission period included in a scheduled PSCH.

For example, the DCI may be defined to include information for indicating a timing for transmitting HARQ-ACK with respect to a scheduled PSCH (for example, the number of symbols from the last symbol included in the PSCH to the symbol for transmission of the HARQ-ACK).

For example, the DCI may be defined to include information for indicating a downlink transmission period, a gap, and an uplink transmission period included in a scheduled PSCH.

For example, the DCI may be defined to be used for the scheduling of a downlink radio communication PSCH in a cell (transmission of a downlink transport block).

For example, the DCI may be defined to be used for the scheduling of an uplink radio communication PSCH in a cell (transmission of an uplink transport block).

Here, the DCI includes information about the scheduling of the PSCH in a case that the PSCH includes the uplink or the downlink. Here, the DCI for the downlink is also referred to as downlink grant or downlink assignment. Here, the DCI for the uplink is also referred to as uplink grant or uplink assignment.

The PSCH is used to transmit uplink data (Uplink Shared CHannel (UL-SCH)) or downlink data (Downlink Shared CHannel (DL-SCH)) from Medium Access Control (MAC). Furthermore, for the downlink, the PSCH is used to transmit system information, Random Access Response (RAR), and the like. For the uplink, the PSCH may be used to transmit the HARQ-ACK and/or CSI along with the uplink data. Furthermore, the PSCH may be used to transmit the CSI only or the HARQ-ACK and CSI only. In other words, the PSCH may be used to transmit the UCI only.

Here, the base station apparatus 3 and the terminal apparatus 2 exchange (transmit and/or receive) signals in the higher layers. For example, the base station apparatus 3 and the terminal apparatus 2 may transmit and/or receive, in a Radio Resource Control (RRC) layer, RRC signaling (also referred to as a Radio Resource Control message (RRC message), or Radio Resource Control information (RRC information)). The base station apparatus 3 and the terminal apparatus 2 may transmit and/or receive a Medium Access Control (MAC) control element in a MAC layer. Here, the RRC signaling and/or the MAC control element is also referred to as higher layer signaling.

The PSCH may also be used to transmit the RRC signaling and the MAC control element. Here, the RRC signaling transmitted from the base station apparatus 3 may be signaling common to multiple terminal apparatuses 2 in a cell. The RRC signaling transmitted from the base station apparatus 3 may be signaling dedicated to a certain terminal apparatus 2 (also referred to as dedicated signaling). In other words, terminal apparatus 2 specific (UE-specific) information may be transmitted through dedicated signaling for the a given terminal apparatus 2. The PSCH may be used to transmit UE capabilities in the uplink. The use of the DCCH (Dedicated Control Channel), which is a logical channel, for RRC message transmission means that dedicated (unique) signaling is used for a given terminal apparatus 2.

Although the same designations PCCH and PSCH are commonly used for the downlink and the uplink, different channels may be defined for the downlink and for the uplink. For example, the PCCH for the downlink may be defined as a Physical Downlink Control CHannel (PDCCH), and the PCCH for the uplink may be defined as a Physical Uplink Control CHannel (PUCCH). For example, the PSCH for the downlink may be defined as a Physical Downlink Shared CHannel (PDSCH), and the PSCH for the uplink may be defined as a Physical Uplink Shared CHannel (PUSCH).

The PRACH is used to transmit a random access preamble (random access message 1). The PRACH is used for indicating the initial connection establishment procedure, the handover procedure, the connection re-establishment procedure, synchronization (timing adjustment) for uplink transmission, and a request for a PUSCH (UL-SCH) resource.

An operation of exclusive OR of CRC parity bits attached to the downlink grant or the uplink grant and identifier information, such as a Cell-Radio Network Temporary Identifier (C-RNTI), a Temporary C-RNTI, and an SPS C-RNTI, may be performed. The C-RNTI and the SPS C-RNTI may be used as identifiers for identifying the terminal apparatus 2 within the cell. The Temporary C-RNTI is used during a contention based random access procedure.

The C-RNTI is used to control the PSCH (PDSCH and/or the PUSCH) in one subframe. The SPS C-RNTI is used to periodically allocate a resource of the PSCH (PDSCH and/or the PUSCH). The Temporary C-RNTI is used during random access. Furthermore, the System Information RNTI (SI-RNTI) may be used as an identifier for identifying the system information message. The SI-RNTI may also be used to allocate a PDSCH resource for broadcasting (notifying) the system information message. A system information message may include one or more system information blocks.

In FIG. 1, the following downlink physical signals may be used for the downlink radio communication.

Synchronization Signal (SS)
Reference Signal (RS)

The synchronization signal is used for the terminal apparatus 2 to take synchronization in the frequency domain and the time domain in the downlink. The synchronization signal may include a Primary Synchronization Signal (PSS) and/or a Secondary Synchronization Signal (SSS). The synchronization signal may also be used to select/identify/determine a base station transmission beam to be used by the base station apparatus 3 for downlink beamforming, and/or a terminal reception beam to be used by the terminal apparatus 2. In other words, the synchronization signal may be used to allow the terminal apparatus 2 to select/identify/determine the index of the base station transmission beam applied to the downlink signal by the base station apparatus 3.

The downlink reference signal (hereinafter also referred to as reference signal in a simple manner) is mostly used for the terminal apparatus 2 to perform channel compensation on a downlink physical channel. In other words, the downlink reference signal may include a demodulation reference signal. The downlink reference signal may be used for the terminal apparatus 2 to calculate downlink channel state information. In other words, the downlink reference signal may include a channel state information reference signal. Furthermore, the downlink reference signal may be used to determine a numerology for a radio parameter or subcarrier spacing, or used for fine synchronization that allows FFT window synchronization to be achieved.

The downlink physical channels and the downlink physical signals may be collectively referred to as downlink signals. The uplink physical channels and the uplink physical signals may be collectively referred to as uplink signals.

The BCH, the UL-SCH, and the DL-SCH are transport channels. A channel used in a Medium Access Control (MAC) layer is referred to as a transport channel. A unit of the transport channel used in the MAC layer is also referred to as a transport block (TB) or a MAC Protocol Data Unit (PDU). The transport block is a unit of data that the MAC layer delivers to the physical layer. In the physical layer, the transport block is mapped to a codeword, and coding processing is performed for each codeword.

A radio protocol structure according to the present embodiment will be described.

In the present embodiment, a protocol stack for handling user data of the terminal apparatus 2 and the base station apparatus 3 is referred to as User-plane (U-plane or UP) protocol stack, and a protocol stack for handling control data of the terminal apparatus 2 and the base station apparatus 3 is referred to as Control-plane (C-plane or CP) protocol stack.

The physical layer (PHY layer) uses the physical channels to provide a transmission service to a higher layer. The PHY layer is connected with a Medium Access Control layer (MAC layer), which is a higher layer, via the transport channels. The data is exchanged via the transport channels between layers, that is, the MAC layer and the PHY layer. The data is transmitted and/or received via the physical channels between the PHY layers of the terminal apparatus 2 and the base station apparatus 3.

The MAC layer performs mapping of various logical channels to the various transport channels. The MAC layer is connected with a Radio Link Control layer (RLC layer), which is a higher layer, via the logical channels. The logical channels are generally classified depending on the type of information to be transmitted, and specifically, classified into the control channels for transmitting the control information and the traffic channels for transmitting the user information. The MAC layer has a function to control the PHY layer in order to perform the Discontinuous Reception and Transmission (DRX and DTX), a function to perform the random access procedure, a function to report transmit power information, a function to perform the HARQ control, and the like.

The RLC layer performs segmentation of the data received from the higher layer to adjust the data size so that a lower layer can appropriately transmit the data. The RLC layer also has a function to assure Quality of Service (QoS) demanded by each data. In other words, the RLC layer has a function of data re-transmission control or the like.

A Packet Data Convergence Protocol layer (PDCP layer) has a header compression function to compress unnecessary control information in order to efficiently transmit, in a radio segment, an IP packet which is the user data. The PDCP layer also has a data encryption function.

A Radio Resource Control layer (RRC layer) is included in the Control-Plane protocol stack. The RRC layer performs configuration and reconfiguration of Radio Bearers (RBs) to control the logical channels, the transport channels, and the physical channels. The RBs may be classified into a Signaling Radio Bearer (SRB) and a Data Radio Bearer (DRB), and the SRB may be used as a path for transmitting an RRC message, which is the control information. The DRB may be used as a path for transmitting the user data. The RBs may be configured between the RRC layers of the base station apparatus 3 and the terminal apparatus 2.

The PHY layer corresponds to a physical layer which is the first layer in the layered structure of the generally known Open Systems Interconnection (OSI) model. The MAC layer, the RLC layer, and the PDCP layer correspond to a data link layer which is the second layer in the OSI model. The RRC layer corresponds to a network layer which is the third layer in the OSI model.

The functional classification of the MAC layer, the RLC layer, and the PDCP layer is illustrative in the above description, and a part or all of each function may not be implemented. Furthermore, some or all of the functions in each layer may be included in another layer. For example, when viewed from the physical layer, the MAC layer control element and the RRC signaling are higher layer signals. For example, when viewed from the MAC layer, the RRC signaling is a higher layer signal. When viewed from the RRC layer, the MAC layer and the physical layer are lower layers. When viewed from the RRC layer, the NAS layer, for example, is also referred to as a higher layer (Higher Layer).

Signalling protocols used between the network and the terminal apparatus 2 are divided into an Access Stratum (AS) protocol and a Non-Access Stratum (NAS) protocol. For example, the protocol in the RRC layer and its lower layers is the Access Stratum protocol used between the terminal apparatus 2 and the base station apparatus 3. Furthermore, the protocol in Connection Management (CM), Mobility Management (MM), or the like for the terminal apparatus 2 is the Non-Access Stratum protocol, and is used between the terminal apparatus and a core network (CN). For example, a communication using the Non-Access Stratum protocol is transparently performed via the base station apparatus 3 between the terminal apparatus 2 and a Mobility Management Entity (MME).

The subframe will now be described. The subframe in the embodiment may also be referred to as a resource unit, a radio frame, a time period, or a time interval. Furthermore, one or more subframes may constitute one radio frame.

Figure 4:
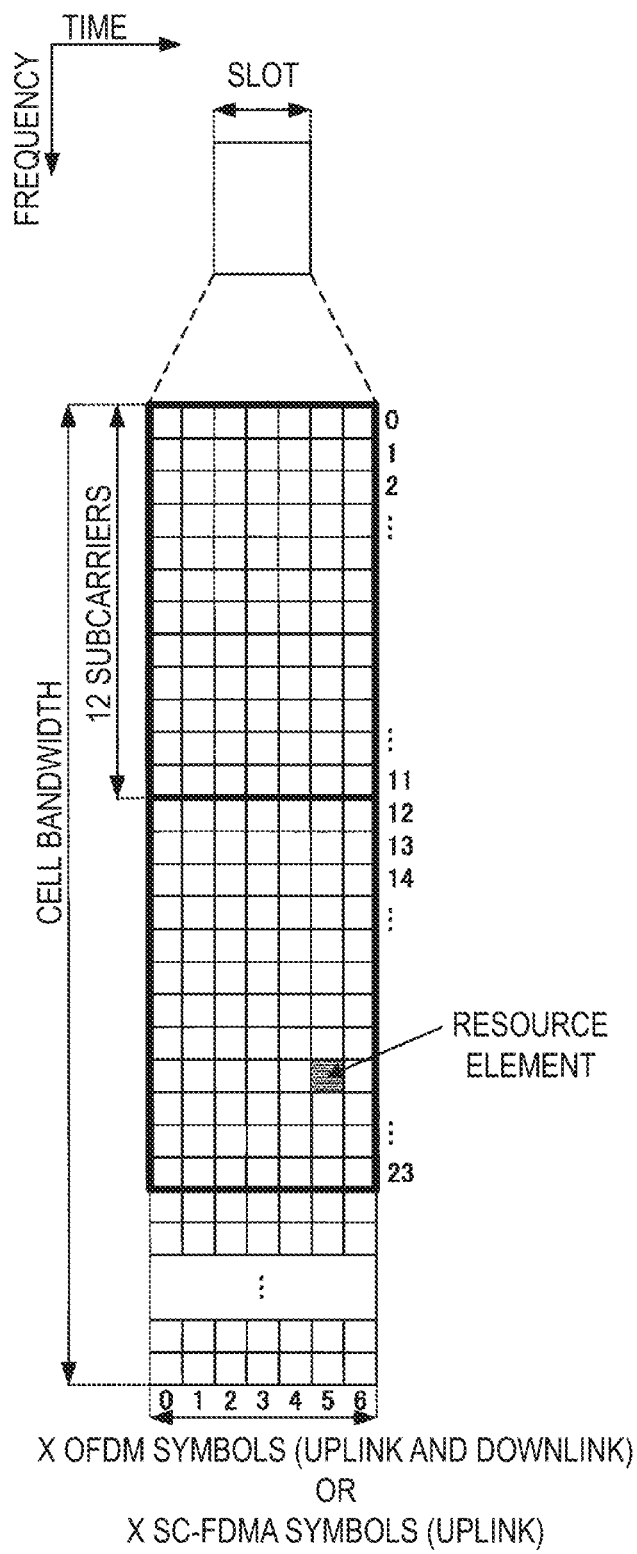
FIG. 4 is a diagram illustrating a schematic configuration of a downlink slot according to an embodiment of the present invention.

FIG. 4 is a diagram illustrating a schematic configuration of a downlink slot according to the present embodiment. Each of the radio frames is 10 ms in length. Each of the radio frames includes 10 subframes and X slots. In other words, the length of one subframe is 1 ms. The time length of each of the slots is defined by subcarrier spacing. For example, in a case that the subcarrier spacing of OFDM symbols is 15 kHz, and NCP (Normal Cyclic Prefix) is used, X=7 or X=14, and 0.5 ms and 1 ms, respectively. Further, in a case that the subcarrier spacing is 60 kHz, X=7 or X=14, and 0.125 ms and 0.25 ms, respectively. FIG. 2 illustrates a case of X=7, as an example. Note that a case of X=14 is similarly configured by expanding the configuration for the case of X=17. In addition, the uplink slot may be defined similarly, and the downlink slot and the uplink slot may be defined separately.

The physical signal or the physical channel transmitted in each of the slots may be represented by a resource grid. The resource grid is defined by a plurality of subcarriers and a plurality of OFDM symbols. The number of subcarriers constituting one slot depends on each of bandwidths of an uplink and a downlink of a cell. Each element within the resource grid is referred to as a resource element. The resource element may be identified by a subcarrier number and an OFDM symbol number.

A resource block is used to represent mapping of a physical downlink channel (e.g., PDSCH) or uplink channel (e.g., PUSCH) to resource elements. For the resource block, a virtual resource block and a physical resource block are defined. A physical downlink channel is first mapped to a virtual resource block. Then, the virtual resource block is mapped to the physical resource block. In a case that the number X of OFDM symbols included in a slot is 7, and NCP is used, one physical resource block is defined by 7 consecutive OFDM symbols in the time domain and 12 consecutive subcarriers in the frequency domain. In other words, one physical resource block includes (7×12) resource elements. In a case of Extended CP (ECP), one physical resource block is defined by, for example, 6 consecutive OFDM symbols in the time domain and 12 consecutive subcarriers in the frequency domain. That is, one physical resource block includes (7×12) resource elements. At this time, one physical resource block corresponds to one slot in the time domain, and corresponds to 180 kHz in the frequency domain in a case that the subcarrier spacing is 15 kHz (720 kHz in a case that the subcarrier spacing is 60 kHz). Physical resource blocks are numbered from 0 in the frequency domain.

Figure 5:
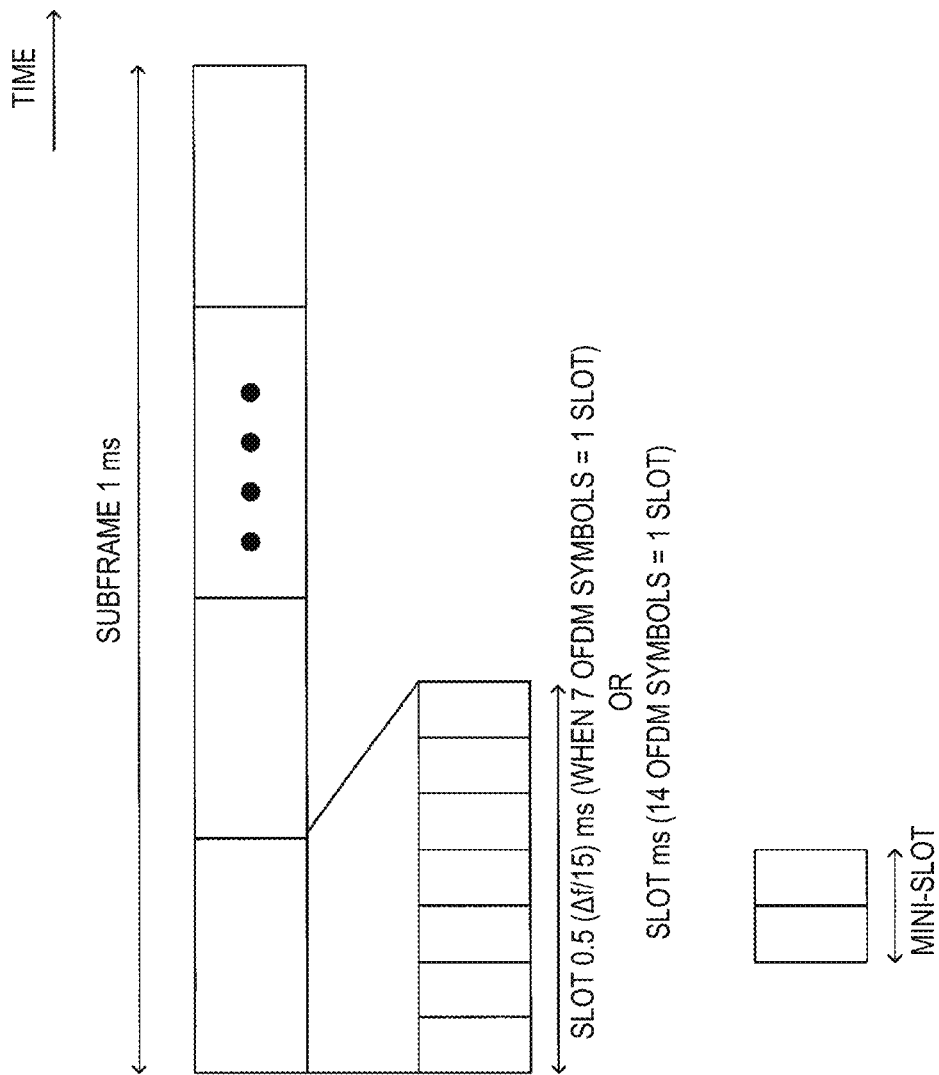
FIG. 5 is a diagram illustrating a relationship in a time domain between a subframe, a slot, and a mini-slot according to an embodiment of the present invention.

Next, the subframe, slot, and mini-slot will be described. FIG. 5 is a diagram illustrating the relationship between a subframe, slot, and mini-slot in the time domain. As illustrated in FIG. 5, three types of time units are defined. The subframe is 1 ms regardless of the subcarrier spacing. The number of OFDM symbols included in the slot is 7 or 14, and the slot length depends on the subcarrier spacing. Here, in a case that the subcarrier spacing is 15 kHz, 14 OFDM symbols are included in one subframe. Thus, with the assumption that the subcarrier spacing is $\Delta f$ (kHz), the slot length may be defined as $0.5/(\Delta f/15)$ ms in a case where the number of OFDM symbols constituting one slot is 7. Here, Δf may be defined by subcarrier spacing (kHz). Further, in a case that the number of OFDM symbols constituting one slot is 7, the slot length is defined as 1/(Δf/15) ms. Here, Δf may be defined by subcarrier spacing (kHz). Further, in a case that the number of OFDM symbols included in the slot is X, the slot length may be defined as X/14/(Δf/15) ms.

The mini-slot (which may also be referred to as a sub-slot) is a time unit including OFDM symbols that are less in number than the OFDM symbols included in the slot. FIG. 5 illustrates, by way of example, a case in which the mini-slot includes 2 OFDM symbols. The OFDM symbols in the mini-slot may match the OFDM symbols constituting the slot. Note that the smallest scheduling unit may be a slot or mini-slot.

Figure 6:
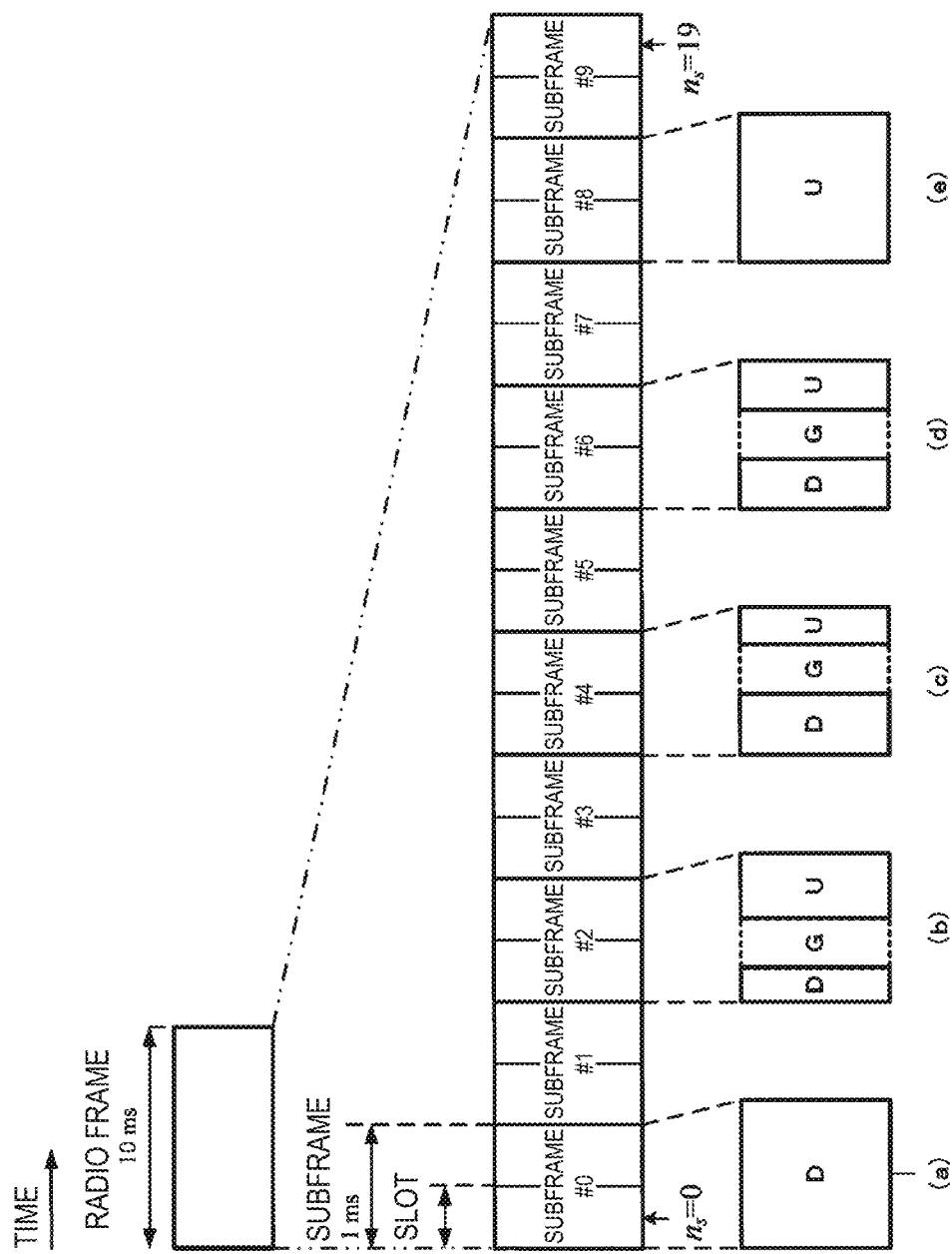
FIG. 6 is a diagram illustrating an example of a slot or a subframe according to an embodiment of the present invention.

FIG. 6 is a diagram illustrating an example of a slot and a subframe (subframe type). Here, a case in which the subcarrier spacing is 15 kHz and the slot length is 0.5 ms is illustrated as an example. In FIG. 6, D represents the downlink, and U represents the uplink. As illustrated in FIG. 6, during a given time period (for example, the minimum time period to be allocated to a UE in the system), at least one of the followings may be included: Downlink part (duration); Gap; Uplink part (duration).

Part (a) of FIG. 6 illustrates an example in which the entire subframe is used for downlink transmission during a certain time period (for example, a minimum time resource unit that can be allocated to a UE, which may also be referred to as a time unit. Furthermore, a combination of a plurality of minimum time resource units may be referred to as a time unit). Part (b) of FIG. 6 illustrates an example in which an uplink is scheduled via the PCCH for example by using the first time resource, and an uplink signal is transmitted after a gap for a processing delay of the PCCH, a time for switching from a downlink to an uplink, and generation of a transmit signal. Part (c) of FIG. 6 illustrates an example in which a downlink PCCH and/or downlink PSCH are transmitted by using the first time resource, and a PSCH or PCCH is transmitted after a gap for a processing delay, a time for switching from a downlink to an uplink, and generation of a transmit signal. Here, for example, the uplink signal may be used to transmit the HARQ-ACK and/or CSI, namely, the UCI. Part (d) of FIG. 6 illustrates an example in which a downlink PCCH and/or a downlink PSCH are transmitted by using the first time resource, and an uplink PSCH and/or PCCH are transmitted after a gap for a processing delay, a time for switching from a downlink to an uplink, and generation of a transmit signal. Here, for example, the uplink signal may be used to transmit the uplink data, namely, the UL-SCH. Part (e) of FIG. 6 illustrates an example in which the entire subframe is used for uplink transmission (uplink PSCH or PCCH).

The above-described downlink part and uplink part may include multiple OFDM symbols as is the case with LTE.

Here, a resource grid may be defined by multiple subcarriers and multiple OFDM symbols or SC-FDMA symbols. The number of subcarriers constituting one slot may depend on a cell bandwidth. One downlink part and one uplink part may each include one or more OFDM symbols, or two or more OFDM symbols. Here, each element within the resource grid is referred to as a resource element. Furthermore, the resource element may be identified by using a subcarrier number and an OFDM symbol or SC-FDMA symbol number.

The base station apparatus 3 may transmit a signal with any subframe configuration in FIG. 6.

Next, an example of operation in which the terminal apparatus 2 in a connected state or an inactive state moves (performs handover) from the cell (source cell) of the first base station apparatus 3 to the cell (target cell) of the second base station apparatus 3 will be described.

Note that in the present embodiment, an example of movement of a terminal apparatus 2 is described. In the example, the terminal apparatus 2 moves between cells by handover in which a base station apparatus 3 (Source eNB) before the handover is different from a base station apparatus 3 (Target eNB) after the handover; however, the present invention is not limited thereto, and may be applied to the movement between cells of the same base station apparatus 3. In addition, the present invention may also be applied to a system in which a plurality of base station apparatuses 3 are Distributed Units (DUs) that virtually operate as a single base station apparatus 3 under control of a Central Unit (CU). The present invention may also be applied to a handover within the same cell for a reason such as updating security information.

Figure 7:
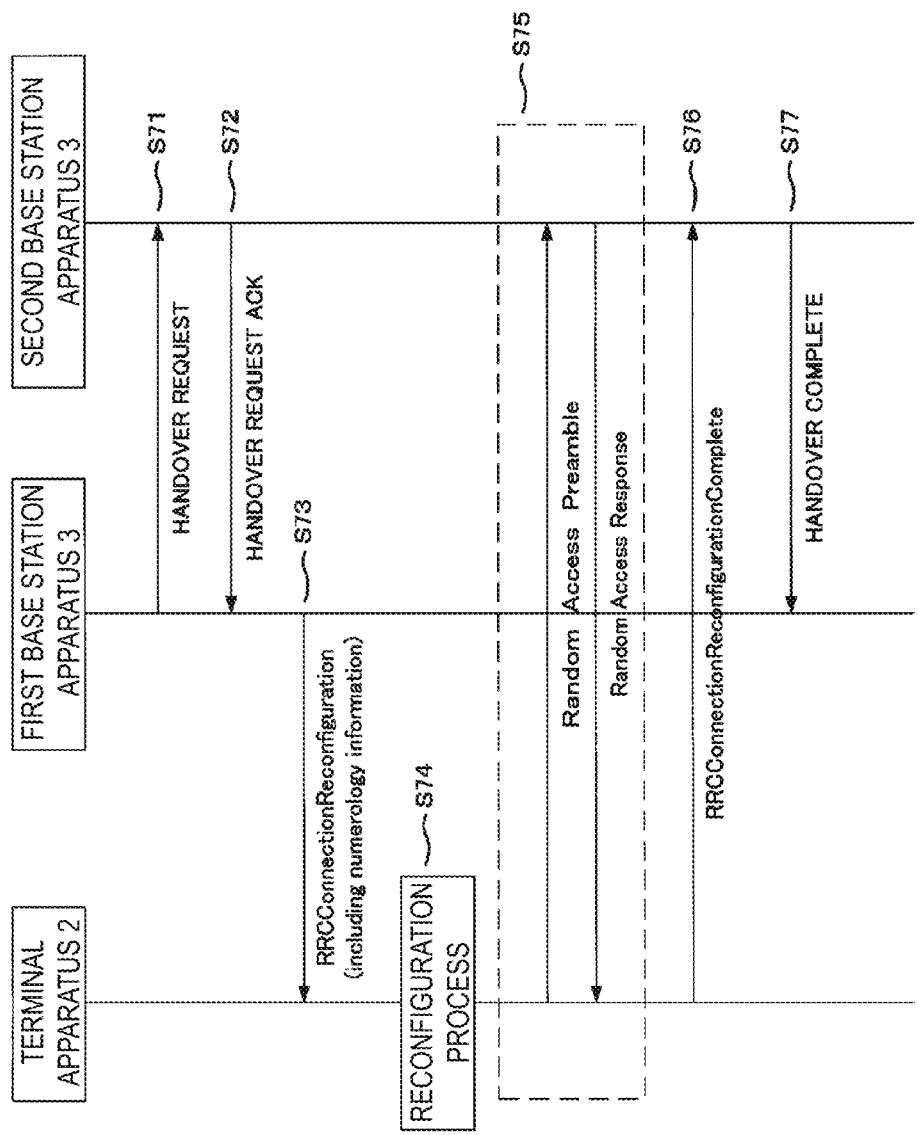
FIG. 7 is a diagram illustrating an example of a handover procedure according to an embodiment of the present invention.

In FIG. 7, the first base station apparatus 3 first notifies the second base station apparatus 3 of a handover request message (HANDOVER REQUEST) of the terminal apparatus 2 (step S71). The handover request message may include some or all of information on a communication capability of the terminal apparatus 2, allocation information for network resources, allocation information for radio resources, information of a numerology used by the terminal apparatus 2, information of a numerology desired to be used by the terminal apparatus 2, and information of a numerology supported by the first base station apparatus 3.

In a case where the second base station apparatus 3 that received the handover request message in step S71 acknowledges (Admit) a handover, the second base station apparatus 3 notifies the first base station apparatus 3 of the handover request acknowledgment message (HANDOVER REQUEST ACK) (step S72). The handover request acknowledgment message may include a configuration for the terminal apparatus 2 from the second base station apparatus 3. For example, the handover request acknowledgment message may include a part of or all the RRC connection reconfiguration message configured for the terminal apparatus 2.

An example of an RRC connection reconfiguration message will be described with reference to FIG. 8.

As illustrated in FIG. 8, the RRC connection reconfiguration message includes some or all of: (8A) rrc-TransactionIdentifier, (8B) measConfig, (8C) mobilityControlInfo, (8D) dedicatedInfoNASList, (8E) radioResourceConfigDedicated, (8F) securityConfigHO, (8G) otherConfig, (8H) fullConfig, (8I) sCellToReleaseList, (8J) sCellToAddModList, and (8K) systemInfomationBlockDedicated.

(8A) rrc-TransactionIdentifier is an element used to identify RRC procedures (transactions), with an integer value from 0 to 3 as a value, for example. (8B) measConfig is information for configuring measurement to be performed by the terminal apparatus 2, and may include a configuration of a gap period for measurement. (8D) dedicatedInfoNASList is a list of NAS layer information, specific to the terminal apparatus 2, that is exchanged between the network and the terminal apparatus 2; wherein, the list includes NAS layer information for each DRB, and the RRC layer transmits this information to the higher layer (NAS layer) transparently. The (8E) may include: information used to set, change, and/or release SRB and DRB; information for changing the configuration of the MAC layer; information on the channel configuration of the physical layer; and the like. (8F) securityConfigHO is a security related configuration, and may include, for example, a configuration of an integrity assurance (Integrity Protection) algorithm in an AS layer of SRB, a configuration of a ciphering algorithm for SRB and/or DRB, and the like. (8H) fullConfig is information for indicating whether a specific option is to be applied to the present RRC connection reconfiguration message; wherein, in a case that (8H) fullConfig is included in the RRC connection reconfiguration message, the terminal apparatus 2 may apply the configuration included in the specific element. (8I) sCellToReleaseList, (8J) and sCellToAddModList may include information used to add, modify, and/or release the secondary cell. (8K) systemInformationBlockDedicated may include a portion of the notification information of the target cell.

(8C) mobilityControlInfo includes parameters, necessary for network controlled mobility (e.g., handover), that are illustrated in FIG. 9. The (8C) mobilityControlInfo may include some or all of: (9A) targetPhysCellId, (9B) carrierFreq, (9C) carrierBandwidth, (9 D) t304, (9E) newUE-Identity, (9F) radioResourceConfigCommon, (9G) rachConfigDedicated. The (8C) mobilityControlInfo may also include various other information.

(9A) targetPhysCellId indicates an identity of the target cell (e.g., a physical cell identity). (9B) carrierFreq indicates information on the frequency used by the terminal apparatus 2 in the target cell. (9C) carrierBandwidth indicates information on the downlink and/or uplink bandwidth of the target cell. (9D) t304 indicates the value of the timer for the handover; wherein, for example, the terminal apparatus 2 may perform a predetermined process in a case that the handover is not successfully completed within the time indicated by the timer. (9E) newUE-Identity indicates a new identifier (e.g., C-RNTI) of the terminal apparatus 2 in the target cell.

(9F) radioResourceConfigCommon includes, as illustrated in FIG. 10, information used to specify a common radio resource configuration, such as random access parameter and static physical layer parameter. The (9F) radioResourceConfigCommon may include some or all of: (10A) rach-ConfigCommon, (10B) prach-Config, (10C) pdsch-ConfigCommon, (10D) pusch-ConfigCommon, (10E) pucch-ConfigCommon, (10F) soundingRS-UL-ConfigCommon, (10G) uplinkPowerControlCommon, (10H) antennaInfoCommon, (10I) p-Max, (10J) tdd-Config. The (9F) radioResourceConfigCommon may also include various other information. Further, the configurations of the (10C) pdsch-ConfigCommon and the (10D) pusch-ConfigCommon may be set together as a single configuration (psch-ConfigCommon).

The (10A) rach-ConfigCommon includes information used to identify common random access parameters (Generic random access parameter). For example, the (10A) rach-ConfigCommon may include, as information of the random access preamble, the number of preambles not used individually (Non-dedicated), threshold information for determining which one of the groups, each including grouped preambles, is to be used, and/or information about power ramping.

The (10B) prach-Config includes information used to identify the PRACH configuration. For example, the (10B) prach-Config may include some or all of: index information of the root sequence of the random access preamble, information of the time/frequency resource used for the random access preamble transmission, and/or numerology information used for transmission of the preamble.

The (10C) pdsch-ConfigCommon includes information for identifying a common PDSCH configuration. For example, the (10C) pdsch-ConfigCommon may include some or all of: information of energy per unit resource of the downlink reference signal, information regarding the power ratio of the downlink reference signal and PDSCH, and/or the numerology information used to receive the PDCCH and/or PDSCH.

The (10D) pusch-ConfigCommon includes information for specifying a common PUSCH configuration and/or an uplink reference signal configuration. For example, the (10D) pusch-ConfigCommon may include some or all of: PUSCH resource band information, hopping information, and/or numerology information used for transmission of PUCCH and/or PUSCH.

The (10E) pucch-ConfigCommon includes information for identifying a common PUCCH configuration. For example, the (10E) pucch-ConfigCommon may include information on the numerology used for transmission of the PUCCH. The (10F) soundingRS-UL-ConfigCommon includes information for identifying a configuration of a common uplink reference signal that can be used for measurement by the base station apparatus 3. For example, the (10F) soundingRS-UL-ConfigCommon may include information on the numerology used to transmit a part or all of the uplink reference signal. The (10G) uplinkPowerControlCommon includes information for identifying a common uplink power control configuration. The (10H) antennaInfoCommon includes information for identifying a common antenna configuration. The (10I) p-Max includes information for limiting uplink transmission by the terminal apparatus 2. The (10) tdd-Config includes information for identifying physical channel configurations specific to TDD.

The (9G) rach-ConfigDedicated includes information used to identify individual random access parameters allocated to the terminal apparatus 2. For example, it may include some or all of the information for explicitly indicating the format of the random access preamble and the time/frequency resource, and/or the information of the numerology used for transmission of the preamble.

The (8G) otherConfig includes some or all of the other configurations.

Further, the (8C) mobilityControlInfo, or any of the information elements included in the (8C) mobilityControlInfo, may include information for identifying the numerology for some or all of: (1) a random access preamble and (2) the PUSCH including a RRC connection reconfiguration complete message that are transmitted by the terminal apparatus 2 in the target cell, (1) a synchronization signal, (2) an important information block, (3) a PDCCH for receiving a PDSCH including a message of a random access response, (4) a PDSCH including a message of a random access response, (5) a PDCCH for receiving a PDSCH including an calling (paging) message, and (6) a PDSCH including an calling (paging) message that are received by the terminal apparatus 2 in the target cell.

Note that the above message is an example, and the RRC connection reconfiguration message may include information other than the RRC connection reconfiguration message, or may not include some information of the above-described RRC connection reconfiguration message. Further, the RRC connection reconfiguration message may have a different structure, a different element name, and a different parameter name from the above-described RRC connection reconfiguration message.

The first base station apparatus 3, which has received the handover request acknowledgment message, notifies the terminal apparatus 2 of a RRC connection reconfiguration message (RRCConfigurationReconfiguration) including a configuration for the terminal apparatus 2 to indicate to the terminal apparatus 2 to perform handover from the source cell to the target cell (step S73).

The terminal apparatus 2, which has received the RRC connection reconfiguration message and can support the configuration included in the RRC connection reconfiguration message, initiates the following reconfiguration process based on the RRC connection reconfiguration message information (step S74).

In the reconfiguration process of step S74, the terminal apparatus 2 starts the downlink synchronization in the target cell. The terminal apparatus 2 resets the function of the MAC layer, if necessary, and performs Re-establishment of the PDCP layer and the RLC layer. Further, in a case that the RRC connection reconfiguration message includes a Radio Resource Configuration, the terminal apparatus 2 applies the Radio Resource Configuration. In a case that the numerology information of the synchronization signal is included in the RRC connection reconfiguration message, the terminal apparatus 2 may detect the synchronization signal based on the numerology information. In a case that the numerology information of the synchronization signal is not provided in the RRC connection reconfiguration message, the terminal apparatus 2 may attempt to detect the synchronization signal by using a predetermined numerology. Accordingly, in a case that there are a plurality of numerologies that may be used for the synchronization signal in the target cell, the numerology of the synchronization signal to be detected can be uniquely specified. Further, in a case that the numerology information of a broadcast channel that conveys an important information block is included in the RRC connection reconfiguration message, the terminal apparatus 2 may receive, based on the numerology information, the broadcast channel that conveys the important information block. In a case that the numerology information of the broadcast channel that conveys the important information block is not provided in the RRC connection reconfiguration message, the terminal apparatus 2 may attempt to receive a broadcast channel that conveys the important information block by using a predetermined numerology or a numerology identical to the numerology for the synchronization signal. In this manner, the numerology of the broadcast channel to be received can be uniquely specified in a case that there is a plurality of numerologies that may be used for the broadcast channel in the target cell.

Then, the terminal apparatus 2 submits the RRC Connection Reconfiguration Complete message to the lower layer (e.g., MAC layer). The terminal apparatus 2 initiates the random access procedure for transmitting the RRC connection reconfiguration complete message, and transmits the random access preamble. The second base station apparatus 3 that has received the random access preamble detects a shift in transmission timing of the terminal apparatus 2, and transmits a random access response including information (timing advance command) for correcting the shift to the terminal apparatus 2 (step S75). In a case that the numerology information for the random access preamble is included in the RRC connection reconfiguration message, the terminal apparatus 2 may transmit the random access preamble based on the numerology information. In a case that the numerology information of the random access preamble is not provided in the RRC connection reconfiguration message, the terminal apparatus 2 may transmit the random access preamble by using a predetermined numerology or a numerology specified in the important information block. In this way, the appropriate numerology can be configured for each terminal apparatus 2 in a case where multiple numerologies are supported in the target cell. In a case that the numerology information for reception of the random access response is included in the RRC connection reconfiguration message, the terminal apparatus 2 may receive the random access response based on the numerology information. In a case that the numerology information for reception of the random access response is not provided in the RRC connection reconfiguration message, the terminal apparatus 2 may receive the random access response by using a predetermined numerology, a numerology identical to the numerology for the synchronized synchronization signal, or a numerology specified by the important information block. In this way, the appropriate numerology can be configured for each terminal apparatus 2 in a case where multiple numerologies are supported in the target cell.

Note that the terminal apparatus 2 may perform the step S74 only in a case that an Information Element (IE) including the target cell identity information is included in the RRC connection reconfiguration message. Further, in a case that an information element including a condition for performing a handover is included in the RRC connection reconfiguration message, and that the condition is met, the terminal apparatus 2 may perform the step S74. The condition for performing a handover may be, for example: that received power (RSRP: Reference Signal Received Power) of a particular downlink reference signal from a source cell falls below a first threshold included in the RRC connection reconfiguration message; that received power (RSRP: Reference Signal Received Power) of a particular downlink reference signal from a target cell is equal to or greater than a second threshold included in the RRC connection reconfiguration message; or a combination thereof.

In a case that the connection to the cell of the handover destination is successful, the terminal apparatus 2 transmits the RRC connection reconfiguration complete message (RRCConfigurationReconfigurationComplete) in the cell successfully connected (step S76). In a case that the numerology information of the PUSCH that conveys the RRC connection reconfiguration complete message is provided in the RRC connection reconfiguration message, the terminal apparatus 2 may transmit the RRC connection reconfiguration complete message based on the numerology information. In a case that the numerology information of the PUSCH that conveys the RRC connection reconfiguration complete message is not provided in the RRC connection reconfiguration message, the terminal apparatus 2 may transmit the RRC connection reconfiguration complete message by using a predetermined numerology, a numerology specified in the critical information block, or a numerology specified in the random access response. In this way, the appropriate numerology can be configured for each terminal apparatus 2 in a case where multiple numerologies are supported in the target cell.

The second base station apparatus 3 that has received the RRC connection reconfiguration complete message notifies the first base station apparatus 3 of the handover completion (HANDOVER COMPLETE) (step S77).

As described above, by acquiring the numerology information for each channel and/or signal used in the target cell from the RRC connection reconfiguration message for indicating the handover, the terminal apparatus 2 can be appropriately configured in a case that: the numerology is different for each channel, the target cell supports multiple numerologies, and/or the numerology is different between the uplink and the downlink.

Figure 11:
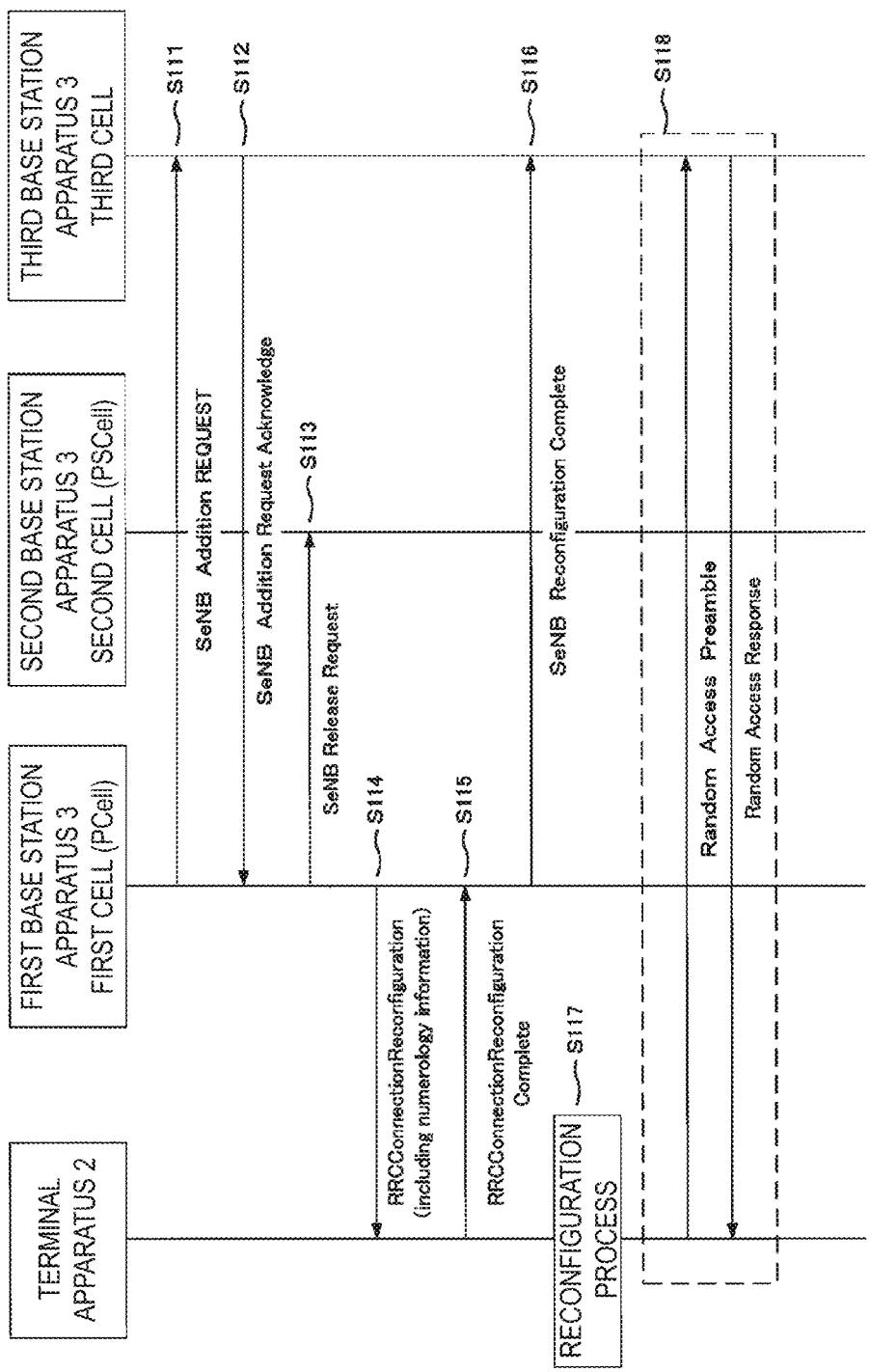
FIG. 11 is a diagram illustrating an example of a procedure for changing an SGC according to an embodiment of the present invention.

With reference to FIG. 11, in which a cell of the first base station apparatus 3 (a first cell) is configured as the primary cell of the master cell group, and a cell of the second base station apparatus 3 (a second cell) is configured as a cell of the secondary cell group (e.g., primary secondary cell (PS-Cell)), an example operation will be described that allows the secondary cell group to be changed from a cell group including the second cell to a cell group including a cell of the third base station apparatus 3 (a third cell), in a case that the terminal apparatus 2 in the connected state or the inactive state is communicating.

Here, a procedure for changing the cell group including mobility control information (MobilityControlInfoSCG) of the secondary cell group is described in the present specification, but the operation is not limited thereto, and can be applied in a case that the secondary cell group is added or the numerology that does not include mobility control information of the secondary cell group (does not cause addition and change of the secondary cell group) is changed.

First, the configuring (modification) of the numerology in the secondary cell group will be described.

The change of the numerology may involve a reset or re-establishment) of the second layer (PDCP layer, RLC layer, and/or MAC layer). Further, the change of the numerology may involve performing a random access in a PSCell. Further, the modification of the secondary cell group may be a synchronous secondary cell group reconfiguration procedure (procedure involving a random access) including a reset and/or re-establishment of the second layer. Still further, in a case that the DRB of the secondary cell group is configured, the modification of the secondary cell group may be a synchronous secondary cell group reconfiguration procedure (procedure involving a random access) including refreshing of security. The procedure may be used in various scenarios. For example, the scenario may be an establishment of a secondary cell group, a change of a PSCell, refreshing a security key, a change of a DRB, and/or a change of a numerology. The terminal apparatus 2 may perform an operation associated with a change of the secondary cell group by receiving a RRC connection reconfiguration message including mobility control information (mobilityControlInfoSCG) for the secondary cell group.

The network controls the mobility of the terminal apparatus 2 in a connected state. Furthermore, the network may control the mobility of the terminal apparatus 2 in an inactive state. In the mobility of network control, a PCell may be changed by using a RRC connection reconfiguration message including mobility control information. Further, in the mobility of network control, an SCell may be changed by using a RRC connection reconfiguration message including (or not including) mobility control information.

Further, the secondary cell group may be established, reconfigured, or released by using the RRC connection reconfiguration message including (or not including) the mobility control information of the secondary cell group. Still further, in a case where a random access to the PSCell is required in reconfiguring the secondary cell group, a modification procedure of the secondary cell group (i.e., a RRC connection reconfiguration message including mobilityControlInfoSCG) may be used.

In FIG. 11, the first base station apparatus 3 first notifies the third base station apparatus 3 of the secondary cell addition request message (SeNB Addition Request) for the terminal apparatus 2 (step S111). The secondary cell addition request message may include the SCG configuration of the second base station apparatus 3. The secondary cell addition request message may include some or all of: information on a communication capability of the terminal apparatus 2, information of network resource allocation, information of radio resource allocation, the numerology information used by the terminal apparatus 2, the information of the numerology which the terminal apparatus 2 desires to be used; and the information of the numerology supported by the first base station apparatus 3.

The third base station apparatus 3 that has received the secondary cell addition request message in step S111 notifies the first base station apparatus 3 of the secondary cell addition request acknowledge message (SeNB Addition Request Acknowledge) of the terminal apparatus 2 (step S112) in a case that the third base station apparatus 3 acknowledges the secondary cell addition request. The secondary cell addition request acknowledge message may include a configuration for the terminal apparatus 2 by the third base station apparatus 3. For example, the secondary cell addition request acknowledge message may include a part or all of the RRC connection reconfiguration message configured for the terminal apparatus 2.

An example of the secondary cell group configuration (SCG-Configuration) included in the RRC connection reconfiguration message will be described with reference to FIG. 12.

As illustrated in FIG. 12, the secondary cell group configuration may include some or all of a (12A) scg-ConfigPartMCG, and a (12B) scg-ConfigPartSCG.

The (12A) scg-ConfigPartMCG is a configuration that is also associated with the master cell group in configuring the secondary cell group, and may include, for example, information related to an update of key information and/or information on power of master cell group and secondary cell group, and the like. The (12B) scg-ConfigPartSCG is a configuration for a secondary cell group, and as illustrated in FIG. 13, may include, for example, a (13A) radioResourceConfigDedicatedSCG, pSCellToAddMod, a (13C) sCellToAddModListSCG, a (13D) sCellToReleaseListSCG, and/or a (13E) mobilityControlInfoSCG.

The (13A) radioResourceConfigDedicatedSCG is a radio resource configuration specific to the terminal apparatus 2, and may include information for adding/changing a DRB, MAC layer configuration information, a timer configuration value, and/or constant information. The (13B) pSCellToAddMod is additional/change information about a cell that becomes a PSCell cell, and may include index information for identifying SCell (PSCell), a cell identity (e.g., a physical cell identity or cell global identity), the downlink carrier frequency information, the information of the common radio resource configuration in the PSCell, and/or the radio resource configuration specific to the terminal apparatus 2 in the PSCell.

The (13C) sCellToAddModListSCG is additional/change information about a cell that becomes an SCell of the secondary cell group, and may include a list of one or more pieces of SCell information. Further, each piece of SCell information may include SCell index information for identifying SCell, a cell identity (e.g., a physical cell identity or a cell global identity), downlink carrier frequency information, and/or the information of the common radio resource configuration in the SCell. The (13D) sCellToReleaseListSCG is information for releasing an SCell of the secondary cell group, and may include a list of one or more pieces of SCell index information.

The (13E) mobilityControlInfoSCG is information required for changing the secondary cell group, and may include an identifier assigned to the terminal apparatus 2 in the secondary cell group, information used to identify the individual random access parameter allocated to the terminal apparatus 2, and/or information related to a ciphering algorithm.

Here, the (12B) scg-ConfigPartSCG or any of the information elements included in the (12B) scg-ConfigPartSCG may include information for identifying part or all of the numerology for: (1) a random access preamble, (2) a PUCCH, and (3) a PUSCH that are transmitted in a cell (PSCell or all SCells) of a secondary cell group to which the terminal apparatus 2 has been reconfigured; and (1) a synchronization signal, (2) a PDCCH for receiving PDSCH including a random access response message, (3) a PDSCH including a random access response message, (4) a PDCCH for receiving PDSCH including a calling (paging) message, (5) a PDSCH including a calling (paging) message that are received in a cell (PSCell or all SCells) of a secondary cell group to which the terminal apparatus 2 has been reconfigured.

For example, as part of information, included in the (13E) mobilityControlInfoSCG, that is used to identify the individual random access parameter allocated to the terminal apparatus 2, information of the numerology used for transmission of the preamble may be included. Further, in a case where a common numerology is used in the cells of the secondary cell group, the (13B) pSCellToAddMod may include information of the numerology used for transmission/reception of the signal and/or channel described above in the PSCell (or commonly in the cells of the secondary cell group). Still further, in a case where independent numerologies are used in the cells of the secondary cell group, the (13B) pSCellToAddMod and/or (13C) sCellToAddModList-SCG, which are SCell information, may each include information on the numerology used for the transmission of the signal and/or channel described above for each SCell.

Note that the above message is an example, and the RRC connection reconfiguration message may include information other than the RRC connection reconfiguration message, or may not include some information of the above-described RRC connection reconfiguration message. Further, the RRC connection reconfiguration message may have a different structure, a different element name, and a different parameter name from the above-described RRC connection reconfiguration message.

The first base station apparatus 3, having received a secondary cell addition request acknowledgment message, notifies the second base station apparatus 3 of a release request (SeNB Release Request) (step S113). Further, by notifying the terminal apparatus 2 of the RRC connection reconfiguration message (RRCConfigurationReconfiguration) including the configuration for the terminal apparatus 2, the first base station apparatus 3 indicates to the terminal apparatus 2 to perform a secondary cell group change involving a cell change from the second cell to the third cell (step S114).

A terminal apparatus 2, which has received the RRC connection reconfiguration message and can support the configuration included in the RRC connection reconfiguration message, transmits a RRC connection reconfiguration complete message (RRCConfigurationReconfiguration-Complete) to the first base station apparatus 3 (step S115). Further, based on the information on the RRC connection reconfiguration message, the following reconfiguration process is started (step S117). Still further, the first base station apparatus 3 that has received the RRC connection reconfiguration complete message (RRCConfigurationReconfigu-rationComplete) notifies the third base station apparatus 3 of the reconfiguration complete message (SeNB Reconfiguration Complete) (step S116).

In the reconfiguration process of step S117, in a case that the RRC connection reconfiguration message includes mobility control information of the secondary cell group and does not include mobility control information of the master cell group (not a handover), or in a case that the configuration of the secondary cell group included in the RRC connection reconfiguration message is configured to be released, the terminal apparatus 2 may reset the function of the MAC layer of the secondary cell group based on the configuration. Further, in a case that the RRC connection reconfiguration message includes mobility control information of the secondary cell group and does not include mobility control information of the master cell group (not a handover), or in a case that the configuration of the secondary cell group included in the RRC connection reconfiguration message is configured to be released, the terminal apparatus 2 may reestablish or recover the PDCP layer. Still further, in a case that RRC connection reconfiguration message includes mobility control information of the secondary cell group, or in a case that the configuration of the secondary cell group included in the RRC connection reconfiguration message is configured to be released, the terminal apparatus 2 may reestablish the RLC layer of the master cell group and/or the RLC layer of the secondary cell group. Yet further still, in a case that the RRC connection reconfiguration message includes mobility control information of the secondary cell group and does not include mobility control information of the master cell group (not a handover), or in a case that the configuration of the secondary cell group included in the RRC connection reconfiguration message is configured to be released, the terminal apparatus 2 may deactivate SCells other than the PSCell in the SCells of the secondary cell group.

Further, in the reconfiguration process of step S117, in a case that the received configuration of the secondary cell group is configured to be released, the terminal apparatus 2 may release the configurations of the secondary cell group other than the DRB configuration, and stop the timer for the secondary cell group.

Still further, in the reconfiguration process of step S117, in a case that the RRC connection reconfiguration message includes a radio resource configuration specific to the terminal apparatus 2, the terminal apparatus 2 may reconfigure the specific radio resource configuration. Further, in a case where the RRC connection reconfiguration message includes addition/change information of a cell that becomes a PSCell, the terminal apparatus 2 performs the addition or change of the PSCell. Further still, in a case where the RRC connection reconfiguration message includes addition/change information of a cell that becomes an SCell of the secondary cell group, the terminal apparatus 2 may perform the addition or change of the SCell of the secondary cell group. Yet further still, in a case that the RRC connection reconfiguration message includes information for releasing the SCell of the secondary cell group, the terminal apparatus 2 may perform release of the SCell of the secondary cell group.

In addition, in a case that the RRC connection reconfiguration message includes the mobility control information of the secondary cell group, the terminal apparatus 2 may start synchronization of the downlink in the target PSCell (third cell).

Here, in a case that the numerology information of the synchronization signal is included in the RRC connection reconfiguration message, the terminal apparatus 2 may detect the synchronization signal based on the information. In a case that the numerology information of the synchronization signal is not provided in the RRC connection reconfiguration message, the terminal apparatus 2 may attempt to detect the synchronization signal by using a predetermined numerology. Accordingly, in a case that there are a plurality of numerologies that may be used for the synchronization signal in the target cell, the numerology of the synchronization signal to be detected can be uniquely specified.

Then, the terminal apparatus 2 initiates the random access procedure to transmit the uplink data, and transmits the random access preamble. The third base station apparatus 3 that has received the random access preamble detects a shift in a transmission timing of the terminal apparatus 2, and transmits a random access response including information (timing advance command) for correcting the shift to the terminal apparatus 2 (step S115). In a case that the numerology information for the random access preamble is included in the RRC connection reconfiguration message, the terminal apparatus 2 may transmit the random access preamble based on the numerology information. In a case that the numerology information of the random access preamble is not provided in the RRC connection reconfiguration message, the terminal apparatus 2 may transmit the random access preamble by using a predetermined numerology. In this way, the appropriate numerology can be configured for each terminal apparatus 2 in a case where multiple numerologies are supported in the target cell. Further, in a case that numerology information for receiving the random access response is included in the RRC connection reconfiguration message, the terminal apparatus 2 may receive the random access response, based on the information. Still further, in a case that the numerology information for reception of the random access response is not provided in the RRC connection reconfiguration message, the terminal apparatus 2 may receive the random access response by using the predetermined numerology or a numerology identical to the numerology of the synchronized synchronization signal. In this way, the appropriate numerology can be configured for each terminal apparatus 2 in a case where multiple numerologies are supported in the target cell.

As described above, by acquiring the numerology information for each channel and/or signal used in the target cell from the RRC connection reconfiguration message, the terminal apparatus 2 can be appropriately configured in a case that the numerology is different for each channel, a case that the target cell supports multiple numerologies, and/or a case that the numerology is different between the uplink and the downlink.

Note that the term "numerology" is used in the above description for convenience, but some or all of the following parameters (A) to (F) used in the system are numerologies.

(A) Sampling Rate
(B) Subcarrier spacing
(C) Subframe length
(D) Unit of time used for scheduling (transmission time interval, Transmission Time Interval(TTI))
(E) OFDM symbol length
(F) Number of OFDM symbols included in one subframe
(G) Antenna port though which signal and/or channel are transmitted Configurations of the apparatuses according to the present embodiment will be described below.

FIG. 2 is a schematic block diagram illustrating a configuration of the terminal apparatus 2 according to the present embodiment. As illustrated, the terminal apparatus 2 is configured to include a radio transmitter and/or receiver 20 and a higher layer processing unit 24. The radio transmitter and/or receiver 20 is configured to include an antenna unit 21, a Radio Frequency (RF) unit 22, and a baseband unit 23. The higher layer processing unit 24 is configured to include a medium access control layer processing unit 25 and a radio resource control layer processing unit 26. The radio transmitter and/or receiver 20 is also referred to as a transmitter, a receiver or a physical layer processing unit. A controller controlling operations of the units based on various conditions may be separately provided.

The higher layer processing unit 24 outputs uplink data (transport block) generated by a user operation or the like, to the radio transmitter and/or receiver 20. The higher layer processing unit 24 performs processing for some or all of the Medium Access Control (MAC) layer, the Packet Data Convergence Protocol (PDCP) layer, the Radio Link Control (RLC) layer, and the Radio Resource Control (RRC) layer.

The medium access control layer processing unit 25 included in the higher layer processing unit 24 performs processing for the Medium Access Control layer. The medium access control layer processing unit 25 controls transmission of a scheduling request, based on various types of configuration information/parameters managed by the radio resource control layer processing unit 26.

The radio resource control layer processing unit 26 included in the higher layer processing unit 24 performs processing for the Radio Resource Control layer. The radio resource control layer processing unit 26 manages various types of configuration information/parameters of the radio resource control layer processing unit 26. The radio resource control layer processing unit 26 sets various types of configuration information/parameters based on higher layer signaling received from the base station apparatus 3. Namely, the radio resource control layer processing unit 26 sets the various configuration information/parameters in accordance with the information for indicating the various configuration information/parameters received from the base station apparatus 3.

The radio transmitter and/or receiver 20 performs processing for the physical layer, such as modulation, demodulation, coding, decoding, and the like. The radio transmitter and/or receiver 20 demultiplexes, demodulates, and decodes a signal received from the base station apparatus 3, and outputs the information resulting from the decoding to the higher layer processing unit 24. The radio transmitter and/or receiver 20 generates a transmit signal by modulating and coding data, and performs transmission to the base station apparatus 3.

The RF unit 22 converts (down-converts) a signal received via the antenna unit 21 into a baseband signal by orthogonal demodulation, and removes unnecessary frequency components. The RF unit 22 outputs the processed analog signal to the baseband unit.

The baseband unit 23 converts the analog signal input from the RF unit 22 into a digital signal. The baseband unit 23 removes a portion corresponding to a Cyclic Prefix (CP) from the digital signal resulting from the conversion, performs Fast Fourier Transform (FFT) of the signal from which the CP has been removed, and extracts a signal in the frequency domain.

The baseband unit 23 generates an SC-FDMA symbol by performing Inverse Fast Fourier Transform (IFFT) of the data, attaches the CP to the generated SC-FDMA symbol, generates a baseband digital signal, and converts the baseband digital signal into an analog signal. The baseband unit 23 outputs the analog signal resulting from the conversion, to the RF unit 22.

The RF unit 22 removes unnecessary frequency components from the analog signal input from the baseband unit 23 using a low-pass filter, up-converts the analog signal into a signal of a carrier frequency, and transmits the up-converted signal via the antenna unit 21. Furthermore, the RF unit 22 amplifies power. Furthermore, the RF unit 22 may have a function to control transmit power. The RF unit 22 is also referred to as a transmit power controller.

Note that the terminal apparatus 2 may include pluralities of some units or pluralities of all the units in order to support transmission and/or reception processing in the same subframe of multiple frequencies (frequency bands or frequency band widths) or multiple cells.

Figure 3:
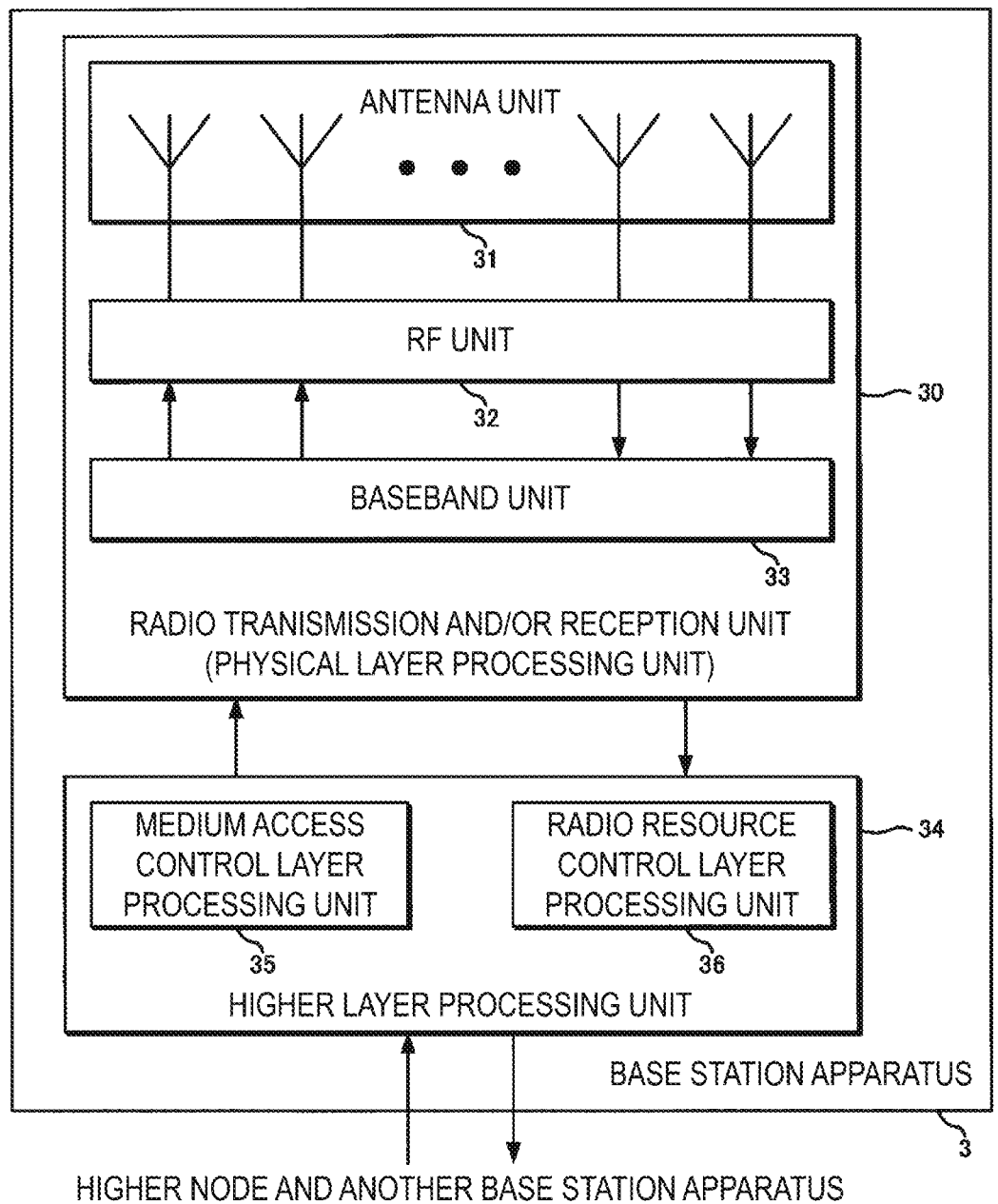
FIG. 3 is a block diagram illustrating an example of a schematic configuration of a base station apparatus according to an embodiment of the present invention.

FIG. 3 is a schematic block diagram illustrating a configuration of the base station apparatus 3 according to the present embodiment. As illustrated, the base station apparatus 3 is configured to include a radio transmitter and/or receiver 30 and a higher layer processing unit 34. The radio transmitter and/or receiver 30 is configured to include an antenna unit 31, an RF unit 32, and a baseband unit 33. The higher layer processing unit 34 is configured to include a medium access control layer processing unit 35 and a radio resource control layer processing unit 36. The radio transmitter and/or receiver 30 is also referred to as a transmitter, a receiver or a physical layer processing unit. A controller controlling operations of the units based on various conditions may be separately provided.

The higher layer processing unit 34 performs processing for some or all of the Medium Access Control (MAC) layer, the Packet Data Convergence Protocol (PDCP) layer, the Radio Link Control (RLC) layer, and the Radio Resource Control (RRC) layer.

The medium access control layer processing unit 35 included in the higher layer processing unit 34 performs processing for the Medium Access Control layer. The medium access control layer processing unit 35 performs processing associated with a scheduling request, based on various types of configuration information/parameters managed by the radio resource control layer processing unit 36.

The radio resource control layer processing unit 36 included in the higher layer processing unit 34 performs processing for the Radio Resource Control layer. The radio resource control layer processing unit 36 generates, or acquires from a higher node, downlink data (transport block) allocated on a physical downlink shared channel, system information, an RRC message, a MAC Control Element (CE), and the like, and performs output to the radio transmitter and/or receiver 30. Furthermore, the radio resource control layer processing unit 36 manages various types of configuration information/parameters for each of the terminal apparatuses 2. The radio resource control layer processing unit 36 may set various types of configuration information/parameters for each of the terminal apparatuses 2 via the higher layer signal. Namely, the radio resource control layer processing unit 36 transmits/broadcasts information indicating various types of configuration information/parameters.

The functionality of the radio transmitter and/or receiver 30 is similar to the functionality of the radio transmitter and/or receiver 20, and hence description thereof is omitted. Note that, in a case that the base station apparatus 3 is connected to multiple transmission reception points 4, some or all of the functions of the radio transmitter and/or receiver 30 may be included in each of the transmission reception points 4.

The higher layer processing unit 34 transmits (transfers) or receives control messages or user data between the base station apparatuses 3, or between a higher-node network device (MME or Serving-GW (S-GW)) and the base station apparatus 3. Although, in FIG. 3, other constituent elements of the base station apparatus 3, a transmission path of data (control information) between the constituent elements, and the like are omitted, it is apparent that the base station apparatus 3 is provided with multiple blocks, as constituent elements, including other functions necessary to operate as the base station apparatus 3. For example, a Radio Resource Management layer processing unit or an Application layer processing unit exists in the higher level than the radio resource control layer processing unit 36.

The "units" in the drawing refer to constituent elements to provide the functions and the procedures of the terminal apparatus 2 and the base station apparatus 3. Such a constituent element may be represented by different terms such as a section, a circuit, a constituting device, a device, a unit, and the like.

Each of the units having the reference signs 20 to 26 included in the terminal apparatus 2 may be configured as a circuit. Each of the units having the reference signs 30 to 36 included in the base station apparatus 3 may be configured as a circuit.

Hereinafter, various aspects of the terminal apparatus 2 and the base station apparatus 3 according to the embodiments of the present invention will be described.

(1) A first aspect of the present invention is a terminal apparatus for communicating with a base station apparatus via a cell, the terminal apparatus including a receiver configured to receive a radio resource control (RRC) connection reconfiguration message from the base station apparatus, and a controller configured to configure a parameter based on a parameter configuration included in the RRC connection reconfiguration message. The parameter configuration includes at least identity information of a target cell, a configuration of a subcarrier spacing, information of a time length of a minimum unit of scheduling and/or information for indicating a slot length, and the information of the subcarrier spacing, the information of the time length of the minimum unit of scheduling, and/or the information for indicating the slot length are individually configured for each of some or all of the channels and/or signals used in the target cell.

(2) In the first aspect of the present invention, the parameter configuration includes a configuration of an uplink subcarrier spacing for transmitting a random access preamble and/or an uplink data channel.

(3) In the first aspect of the present invention, the parameter configuration includes a configuration of a downlink subcarrier spacing for receiving a random access response and/or paging and/or a downlink data channel.

(4) A second aspect of the present invention is a base station apparatus for communicating with a terminal apparatus via a cell, the base station apparatus including a transmitter configured to transmit a RRC connection reconfiguration message to the terminal apparatus, and a controller configured to generate a parameter configuration to be included in the RRC connection reconfiguration message. The parameter configuration includes at least identity information of a target cell, a configuration of a subcarrier spacing, information of a time length of a minimum unit of scheduling, and/or information for indicating a slot length, and the configuration of the subcarrier spacing, the information of the time length of the minimum unit of scheduling, and/or the information for indicating the slot length are individually configured for each of some or all of the channels and/or signals used in the target cell.

(5) A third aspect of the present invention is a communication method applied to a terminal apparatus for communicating with a base station apparatus via a cell, the communication method including at least the steps of receiving a RRC connection reconfiguration message from the base station apparatus, and configuring a parameter based on a parameter configuration included in the radio resource control connection reconfiguration message. The parameter configuration includes at least identity information of a target cell, a configuration of a subcarrier spacing, information of a time length of a minimum unit of scheduling, and/or information for indicating a slot length, and the configuration of the subcarrier spacing, the information of the time length of the minimum unit of scheduling, and/or the information for indicating the slot length are individually configured for each of some or all of the channels and/or signals used in the target cell.

(6) A fourth aspect of the present invention is an integrated circuit implemented on a terminal apparatus for communicating with a base station apparatus via a cell, the integrated circuit causing the terminal apparatus to perform receiving a radio resource control (RRC) connection reconfiguration message from the base station apparatus, and configuring a parameter based on a parameter configuration included in the RRC connection reconfiguration message. The parameter configuration includes at least identity information of a target cell, a configuration of a subcarrier spacing, information of a time length of a minimum unit of scheduling, and/or information for indicating a slot length, and the configuration of the subcarrier spacing, the information of the time length of the minimum unit of scheduling, and/or the information for indicating the slot length are individually configured for each of some or all of the channels and/or signals used in the target cell.

(A1) One aspect of the present invention is a terminal apparatus for communicating with a base station apparatus and a cell via a cell, the terminal apparatus including: a receiver configured to receive a radio resource control (RRC) reconfiguration message from the base station apparatus; and a controller configured to configure a parameter based on the parameter included in the RRC reconfiguration message. The parameter includes at least identity information of a target cell and a configuration of a subcarrier spacing, and the configuration of the subcarrier spacing is configured for each of the target cells.

(A2) In one aspect of the present invention, the configuration of the subcarrier spacing for at least one of the target cells includes a configuration of a subcarrier spacing for a random access preamble and/or a configuration of a subcarrier spacing for a random access response.

(A3) One aspect of the present invention is a base station apparatus for communicating with a terminal apparatus via a cell, the base station apparatus including: a transmitter configured to transmit a radio resource control (RRC) reconfiguration message to the terminal apparatus; and a controller configured to generate a parameter to be included in the RRC reconfiguration message. The parameter includes at least identity information of a target cell and a configuration of a subcarrier spacing, and the configuration of the subcarrier spacing is configured for each of the target cells.

(A4) One aspect of the present invention is a communication method applied to a terminal apparatus for communicating with a base station apparatus via a cell, the communication method including at least the steps of receiving a radio resource control (RRC) reconfiguration message from the base station apparatus, and generating a parameter based on the parameter included in the RRC reconfiguration message. The parameter includes at least identity information of a target cell and a configuration of a subcarrier spacing, and the configuration of the subcarrier spacing is configured for each of the target cells.

(4) One aspect of the present invention is an integrated circuit implemented on a terminal apparatus for communicating with a base station apparatus via a cell, the integrated circuit causing the terminal to perform receiving an RRC reconfiguration message from the base station apparatus, and configuring a parameter based on the parameter included in the RRC reconfiguration message. The parameter includes at least identity information of a target cell and a configuration of a subcarrier spacing, and the configuration of the subcarrier spacing is configured for each of the target cells.

In this way, the terminal apparatus 2 and the base station apparatus 3 can communicate efficiently.

Note that the embodiments discussed thus far are merely examples, and the embodiments can be implemented using various kinds of modifications, replacement, or the like. For example, an uplink transmission scheme can be applied to both communication systems of a Frequency Division Duplex (FDD) scheme and a Time Division Duplex (TDD) scheme. The names of the parameters, events, and the like indicated in the embodiments are given for the sake of convenience of description; therefore, even in a case that the actual applied names differ from the names in the embodiments of the present invention, the spirit of the invention claimed in the embodiments of the present invention is not affected in any way.

The term "connection" used in each embodiment is not limited to the configuration in which a certain device and another device are directly connected by using a physical line, and includes a configuration in which the devices are logically connected and a configuration in which the devices are wirelessly connected by using a radio technology.

The terminal apparatus 2 is also called a user terminal, a mobile station device, a communication terminal, a mobile device, a terminal, User Equipment (UE), and a Mobile Station (MS). The base station apparatus 3 is also called a radio base station apparatus, a base station, a radio base station, a fixed station, a NodeB (NB), an evolved NodeB (eNB), a Base Transceiver Station (BTS), a Base Station (BS), an NR NodeB (NR NB), NNB, a Transmission and Reception Point (TRP), or a next generation Node B (gNB).

The base station apparatus 3 according to an aspect of the present invention can also be realized as an aggregation (an apparatus group) constituted of multiple apparatuses. Each of the apparatuses constituting such an apparatus group may include a portion or all of each function or each functional block of the base station apparatus 3 according to the above-described embodiment. The apparatus group may include each general function or each functional block of the base station apparatus 3. Furthermore, the terminal apparatus 2 according to the above-described embodiment can also communicate with the base station apparatus 3 as the aggregation.

Furthermore, the base station apparatus 3 according to the above-described embodiment may serve as an Evolved Universal Terrestrial Radio Access Network (EUTRAN) or a NextGen Core network. Furthermore, the base station apparatus 3 according to the above-described embodiment may have some or all portions of the functions of a node higher than an eNodeB.

A program running on an apparatus according to an aspect of the present invention may serve as a program that controls a Central Processing Unit (CPU) and the like to cause a computer to operate in such a manner as to realize the functions of the above-described embodiment according to the present invention. Programs or the information handled by the programs are temporarily read into a volatile memory, such as a Random Access Memory (RAM) while being processed, or stored in a non-volatile memory, such as a flash memory, or a Hard Disk Drive (HDD), and then read by the CPU to be modified or rewritten, as necessary.

Note that the apparatuses in the above-described embodiment may be partially enabled by a computer. In such a case, a program for realizing such control functions may be recorded on a computer-readable recording medium to cause a computer system to read the program recorded on the recording medium for execution. It is assumed that the "computer system" refers to a computer system built into the apparatuses, and the computer system includes an operating system and hardware components such as a peripheral device. Furthermore, the "computer-readable recording medium" may be any of a semiconductor recording medium, an optical recording medium, a magnetic recording medium, and the like.

Moreover, the "computer-readable recording medium" may include a medium that dynamically retains a program for a short period of time, such as a communication line that is used to transmit the program over a network such as the Internet or over a communication line such as a telephone line, and may also include a medium that retains a program for a fixed period of time, such as a volatile memory within the computer system for functioning as a server or a client in such a case. Furthermore, the above-described program may be configured to realize some of the functions described above, and additionally may be configured to realize the functions described above, in combination with a program already recorded in the computer system.

Furthermore, each functional block or various characteristics of the apparatuses used in the above-described embodiment may be implemented or performed on an electric circuit, that is, typically an integrated circuit or multiple integrated circuits. An electric circuit designed to perform the functions described in the present specification may include a general-purpose processor, a Digital Signal Processor (DSP), an Application Specific Integrated Circuit (ASIC), a Field Programmable Gate Array (FPGA), or other programmable logic devices, discrete gates or transistor logic, discrete hardware components, or a combination thereof. The general-purpose processor may be a microprocessor, or the processor may be a processor of known type, a controller, a micro-controller, or a state machine instead. The general-purpose processor or each of the above-mentioned circuits may be constituted of a digital circuit, or may be constituted of an analog circuit. Furthermore, in a case that with advances in semiconductor technology, a circuit integration technology appears that replaces the present integrated circuits, it is also possible to use an integrated circuit based on the technology.

Note that the invention of the present patent application is not limited to the above-described embodiments. In the embodiment, apparatuses have been described as an example, but the invention of the present application is not limited to these apparatuses, and is applicable to a terminal apparatus or a communication apparatus of a fixed-type or a stationary-type electronic apparatus installed indoors or outdoors, for example, an AV apparatus, a kitchen apparatus, a cleaning or washing machine, an air-conditioning apparatus, office equipment, a vending machine, and other household apparatuses.

The embodiments of the present invention have been described in detail above referring to the drawings, but the specific configuration is not limited to the embodiments and includes, for example, an amendment to a design that falls within the scope that does not depart from the gist of the present invention. Furthermore, various modifications can be made to the aspect of the present invention within the scope of the present invention defined by claims, and embodiments that are made by suitably combining technical means disclosed according to the different embodiments are also included in the technical scope of the present invention. Furthermore, a configuration in which constituent elements, described in the respective embodiments and having mutually the same effects, are substituted for one another is also included in the technical scope of the present invention.

INDUSTRIAL APPLICABILITY

An aspect of the present invention can be utilized, for example, in a communication system, communication equipment (for example, a cellular phone apparatus, a base station apparatus, a radio LAN apparatus, or a sensor device), an integrated circuit (for example, a communication chip), or a program.

REFERENCE SIGNS LIST

2 Terminal apparatus
3 Base station apparatus
20, 30 Radio transmission and/or reception unit
21, 31 Antenna unit
22, 32 RF unit
23, 33 Baseband unit
24, 34 Higher layer processing unit
25, 35 Medium access control layer processing unit
26, 36 Radio resource control layer processing unit
4 Transmission and/or reception point

The invention claimed is:

1. A terminal apparatus for communicating with a base station apparatus, the terminal apparatus comprising:
reception circuitry configured to receive information included in a radio resource control (RRC) reconfiguration message from the base station apparatus,
the information including an identity of a target cell, a first subcarrier spacing designated to a transmission of a synchronization signal in the target cell, and a second subcarrier spacing designated to a transmission of a Physical Downlink Shared Channel including a message of a random access response in the target cell,
the reception circuitry being configured to perform, based on the first subcarrier spacing, a downlink synchronization in the target cell indicated by the identity, and
the reception circuitry being configured to receive, based on the second subcarrier spacing, the random access response in the target cell indicated by the identity.

2. The terminal apparatus according to claim 1, wherein the information includes a subcarrier spacing for a transmission of a random access preamble in the target cell.

3. A base station apparatus for communicating with a terminal apparatus, the base station apparatus comprising:
processing circuitry configured to generate information to be included in a radio resource control (RRC) reconfiguration message to be transmitted to the terminal apparatus, and
transmission circuitry configured to transmit, to the terminal apparatus, the RRC reconfiguration message including the information,
the information including an identity of a target cell, a first subcarrier spacing designated to a transmission of a synchronization signal in the target cell, and a second subcarrier spacing designated to a transmission of a Physical Downlink Shared Channel including a message of a random access response in the target cell.

4. The base station apparatus according to claim 3, wherein the information includes a subcarrier spacing for a transmission of a random access preamble in the target cell.

5. A communication method applied to a terminal apparatus for communicating with a base station apparatus, the communication method comprising:
receiving information included in a radio resource control (RRC) reconfiguration message from the base station apparatus,
the information including an identity of a target cell, a first subcarrier spacing designated to a transmission of a synchronization signal in the target cell, and a second subcarrier spacing designated to a transmission of a Physical Downlink Shared Channel including a message of a random access response in the target cell;
performing, based on the first subcarrier spacing, a downlink synchronization in the target cell indicated by the identity; and
receiving, based on the second subcarrier spacing, the random access response in the target cell indicated by the identity.

6. A communication method applied to a base station apparatus for communicating with a terminal apparatus, the communication method comprising:
generating information to be included in a radio resource control (RRC) reconfiguration message to be transmitted to the terminal apparatus, and
transmitting, to the terminal apparatus, the RRC reconfiguration message including the information,
the information including an identity of a target cell, a first subcarrier spacing designated to a transmission of a synchronization signal in the target cell, and a second subcarrier spacing designated to a transmission of a Physical Downlink Shared Channel including a message of a random access response in the target cell.

7. The terminal apparatus according to claim 1, wherein the target cell is a specific cell in a secondary cell group (SCG).

8. The base station apparatus according to claim 3, wherein the target cell is a specific cell in a secondary cell group (SCG).

* * * * *